United States Patent
Rahman et al.

(10) Patent No.: US 12,369,177 B2
(45) Date of Patent: *Jul. 22, 2025

(54) METHOD AND APPARATUS FOR BEAM MANAGEMENT FOR MOBILITY

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,283

(22) Filed: Feb. 16, 2024

(65) Prior Publication Data

US 2024/0188114 A1 Jun. 6, 2024

Related U.S. Application Data

(63) Continuation of application No. 18/057,200, filed on Nov. 18, 2022, now Pat. No. 11,937,282, which is a continuation of application No. 17/100,657, filed on Nov. 20, 2020, now Pat. No. 11,510,212.

(60) Provisional application No. 62/939,971, filed on Nov. 25, 2019.

(51) Int. Cl.
*H04W 72/53* (2023.01)
*H04B 7/024* (2017.01)
*H04W 72/044* (2023.01)
*H04W 72/0446* (2023.01)
*H04W 72/23* (2023.01)

(52) U.S. Cl.
CPC ............ *H04W 72/53* (2023.01); *H04B 7/024* (2013.01); *H04W 72/0446* (2013.01); *H04W 72/046* (2013.01); *H04W 72/23* (2023.01)

(58) Field of Classification Search
CPC . H04W 72/53; H04W 72/23; H04W 72/0446; H04W 72/046; H04B 7/024
See application file for complete search history.

(56) References Cited

U.S. PATENT DOCUMENTS

2018/0227031 A1 8/2018 Guo et al.
2019/0037426 A1 1/2019 Yu et al.
2019/0222284 A1* 7/2019 Huang .................. H04W 72/23
(Continued)

FOREIGN PATENT DOCUMENTS

EP 3820052 A1 5/2021
WO 2018175820 A1 9/2018
WO 2019193581 A2 10/2019

OTHER PUBLICATIONS

International Search Report of the International Searching Authority dated Feb. 24, 2021 in connection with International Application No. PCT/KR2020/016712, 3 pages.

(Continued)

*Primary Examiner* — Jael M Ulysse

(57) ABSTRACT

A method for operating a user equipment (UE) comprises receiving configuration information on a set of transmission configuration indicator (TCI) states, receiving a TCI state indication associated with downlink (DL) transmissions in a plurality of downlink (DL) time slots, decoding the TCI state indication, and applying the TCI state indication to a reception of the DL transmissions in the plurality of DL time slots.

17 Claims, 15 Drawing Sheets

(56) References Cited

U.S. PATENT DOCUMENTS

| | | | |
|---|---|---|---|
| 2019/0260458 A1* | 8/2019 | Zhou | H04W 72/046 |
| 2019/0260532 A1* | 8/2019 | Manolakos | H04L 5/0051 |
| 2019/0268053 A1* | 8/2019 | John Wilson | H04B 7/0695 |
| 2019/0281587 A1* | 9/2019 | Zhang | H04W 72/23 |
| 2019/0297637 A1* | 9/2019 | Liou | H04W 72/1273 |
| 2019/0313389 A1* | 10/2019 | John Wilson | H04W 72/21 |
| 2020/0029274 A1* | 1/2020 | Cheng | H04W 76/28 |
| 2020/0053767 A1* | 2/2020 | Bai | H04W 72/23 |
| 2020/0077428 A1* | 3/2020 | Zhou | H04W 72/23 |
| 2020/0092860 A1* | 3/2020 | Khoshnevisan | H04W 76/27 |
| 2020/0100201 A1* | 3/2020 | Farmanbar | H04W 56/0045 |
| 2020/0314857 A1* | 10/2020 | Pezeshki | H04W 16/28 |
| 2020/0314858 A1* | 10/2020 | Xu | H04W 72/21 |
| 2020/0351892 A1* | 11/2020 | Yi | H04L 5/0092 |
| 2020/0383096 A1* | 12/2020 | Yang | H04L 5/0094 |
| 2021/0045141 A1* | 2/2021 | Lee | H04L 5/0053 |
| 2021/0112560 A1* | 4/2021 | Khoshnevisan | H04L 5/0098 |
| 2021/0136802 A1* | 5/2021 | Cirik | H04L 5/0092 |
| 2021/0143954 A1* | 5/2021 | Duan | H04W 52/0216 |
| 2021/0185709 A1* | 6/2021 | Takeda | H04B 7/022 |

OTHER PUBLICATIONS

Written Opinion of the International Searching Authority dated Feb. 24, 2021 in connection with International Application No. PCT/KR2020/016712, 5 pages.

NTT Docomo, Inc., "Enhancements on multi-TRP/panel transmission," R1-1911184, 3GPP TSG RAN WG1 Meeting #98bis, Chongqing, China, Oct. 14-20, 2019, 35 pages.

ZTE Corporation, "Discussion on cross-carrier scheduling with different numerologies," R1-1904154, 3GPP TSG RAN WG1 Meeting #96bis, Xian, China, Apr. 8-12, 2019, 9 pages.

"3rd Generation Partnership Project; Technical Specification Group Radio Access Network; Evolved Universal Terrestrial Radio Access (E-UTRA); Physical channels and modulation (Release 15)", 3GPP TS 36.211 V15.7.0, Sep. 2019, 239 pages.

"3rd Generation Partnership Project; Technical Specification Group Radio Access Network; Evolved Universal Terrestrial Radio Access (E-UTRA); Multiplexing and channel coding (Release 15)", 3GPP TS 36.212 V15.7.0, Sep. 2019, 246 pages.

"3rd Generation Partnership Project; Technical Specification Group Radio Access Network; Evolved Universal Terrestrial Radio Access (E-UTRA); Physical layer procedures (Release 15)", 3GPP TS 36.213 V15.7.0, Sep. 2019, 551 pages.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.7.0, Sep. 2019, 134 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.7.0, Sep. 2019, 962 pages.

"3rd Generation Partnership Project; Technical Specification Group Radio Access Network; NR; Physical channels and modulation (Release 15)", 3GPP TS 38.211 V15.7.0, Sep. 2019, 97 pages.

"3rd Generation Partnership Project; Technical Specification Group Radio Access Network; NR; Multiplexing and channel coding (Release 15)", 3GPP TS 38.212 V15.7.0, Sep. 2019, 101 pages.

"3rd Generation Partnership Project; Technical Specification Group Radio Access Network; NR; Physical layer procedures for control (Release 15)", 3GPP TS 38.213 V15.7.0, Sep. 2019, 108 pages.

"3rd Generation Partnership Project; Technical Specification Group Radio Access Network; NR; Physical layer procedures for data (Release 15)", 3GPP TS 38.214 V15.7.0, Sep. 2019, 106 pages.

"3rd Generation Partnership Project; Technical Specification Group Radio Access Network; NR; Physical layer measurements (Release 15)", 3GPP TS 38.215 V15.7.0, Jun. 2020, 16 pages.

"3rd Generation Partnership Project; Technical Specification Group Radio Access Network; NR; Medium Access Control (MAC) protocol specification (Release 15)", 3GPP TS 38.321 V15.7.0, Sep. 2019, 78 pages.

"3rd Generation Partnership Project; Technical Specification Group Radio Access Network; NR; Radio Resource Control (RRC) protocol specification (Release 15)", 3GPP TS 38.331 V15.7.0, Sep. 2019, 527 pages.

Extended European Search Report dated Aug. 31, 2022 regarding Application No. 20892805.1, 10 pages.

European Patent Office, Communication pursuant to Article 94(3) EPC issued Sep. 27, 2024, regarding Application No. 20892805.1, 7 pages.

* cited by examiner

METHOD AND APPARATUS FOR BEAM MANAGEMENT FOR MOBILITY

CROSS-REFERENCE TO RELATED APPLICATIONS AND CLAIM OF PRIORITY

This application is a continuation of U.S. patent application Ser. No. 18/057,200, filed on Nov. 18, 2022, which is a continuation of U.S. patent application Ser. No. 17/100,657, filed on Nov. 20, 2020, which claims priority to U.S. Provisional Patent Application No. 62/939,971 filed on Nov. 25, 2019. The content of the above-identified patent document is incorporated herein by reference.

TECHNICAL FIELD

The present disclosure relates generally to wireless communication systems and more specifically for beam management for mobility.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment (UE) can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two-dimensional array transmit antennas or, in general, antenna array geometry which accommodates a large number of antenna elements.

SUMMARY

Embodiments of the present disclosure provide methods and apparatuses to enable downlink and uplink multi-beam operation in a wireless communication system.

In one embodiment, a UE is provided. The UE comprises a transceiver configured to receive configuration information on a set of transmission configuration indicator (TCI) states, and receive a TCI state indication associated with downlink (DL) transmissions in a plurality of downlink (DL) time slots. The UE further includes a processor coupled to the transceiver. The processor is configured to decode the TCI state indication, and apply the TCI state indication to a reception of the DL transmissions in the plurality of DL time slots.

In another embodiment, a BS in a wireless communication system is provided. The BS includes a processor configured to generate configuration information on a set of transmission configuration indicator (TCI) states, and generate a TCI state indication associated with downlink (DL) transmissions in a plurality of downlink (DL) time slots. The BS further includes a transceiver coupled to the processor. The transceiver is configured to transmit the configuration information, and transmit the TCI state indication.

In yet another embodiment, a method for operating a UE is provided. The method comprises receiving configuration information on a set of transmission configuration indicator (TCI) states, receiving a TCI state indication associated with downlink (DL) transmissions in a plurality of downlink (DL) time slots, decoding the TCI state indication, and applying the TCI state indication to a reception of the DL transmissions in the plurality of DL time slots.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
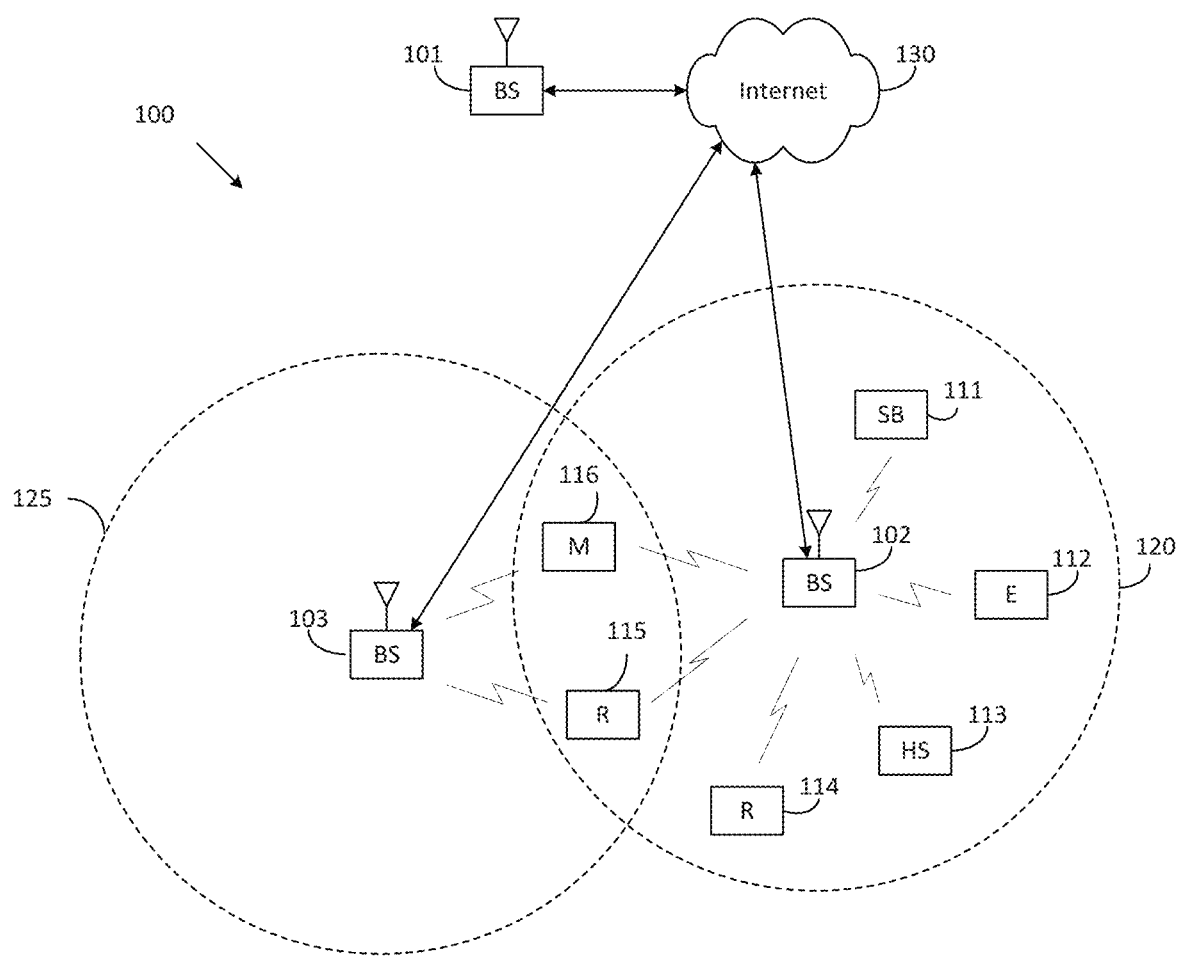
FIG. 1 illustrates an example wireless network according to embodiments of the present disclosure.

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.2.0, "E-UTRA, Physical channels and modulation" (herein "REF 1"); 3GPP TS 36.212 v16.2.0, "E-UTRA, Multiplexing and Channel coding" (herein "REF 2"); 3GPP TS 36.213 v16.2.0, "E-UTRA, Physical Layer Procedures" (herein "REF 3"); 3GPP TS 36.321 v16.2.0, "E-UTRA, Medium Access Control (MAC) protocol specification" (herein "REF 4"); 3GPP TS 36.331 v16.2.0, "E-UTRA, Radio Resource Control (RRC) protocol specification" (herein "REF 5"); 3GPP TR 22.891 v14.2.0 (herein "REF 6"); 3GPP TS 38.212 v16.2.0, "E-UTRA, NR, Multiplexing and channel coding" (herein "REF 7"); 3GPP TS 38.214 v16.2.0, "E-UTRA, NR, Physical layer procedures for data" (herein "REF 8"); and 3GPP TS 38.213 v16.2.0, "E-UTRA, NR, Physical Layer Procedures for control" (herein "REF 9").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (COMP) transmission and reception, interference mitigation and cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band.

Figure 2:
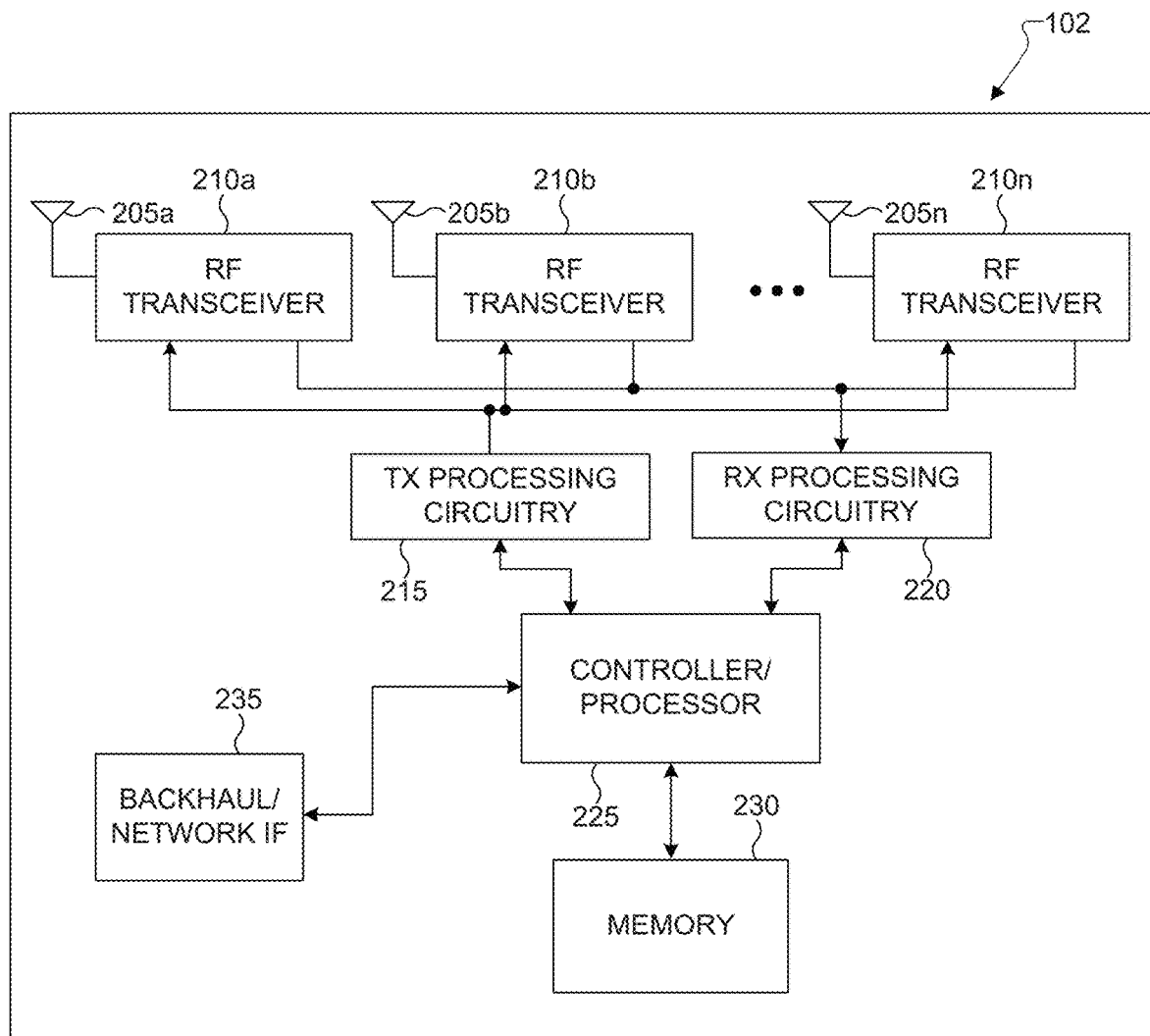
FIG. 2 illustrates an example gNB according to embodiments of the present disclosure.
Figure 3:
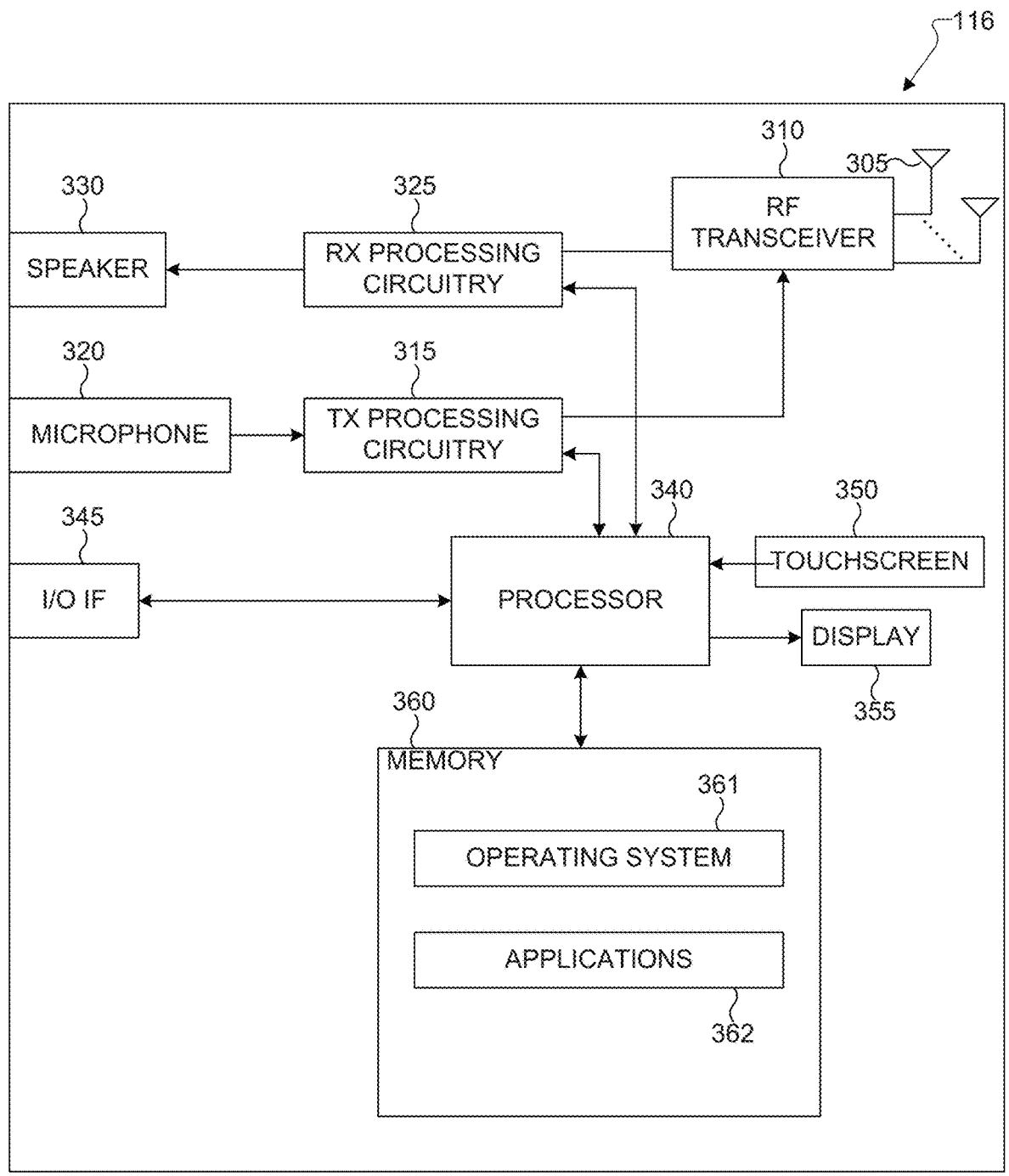
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information on a set of transmission configuration indicator (TCI) states, receiving a TCI state indication associated with downlink (DL) transmissions in a plurality of downlink (DL) time slots, decoding the TCI state information, and applying the TCI state indication to a reception of the DL transmissions in the plurality of DL time slots, and one or more of the gNBs 101-103 includes circuitry, programing, or a combination thereof, for generating configuration information on a set of transmission configuration indicator (TCI) states, generating a TCI state indication associated with a downlink (DL) transmission in a plurality of downlink (DL) time slots, transmitting the configuration information, and transmitting the TCI state indication.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information on a set of transmission configuration indicator (TCI) states, receiving a TCI state indication associated with downlink (DL) transmissions in a plurality of downlink (DL) time slots, decoding the TCI state information, and applying the TCI state indication to a reception of the DL transmissions in the plurality of DL time slots. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
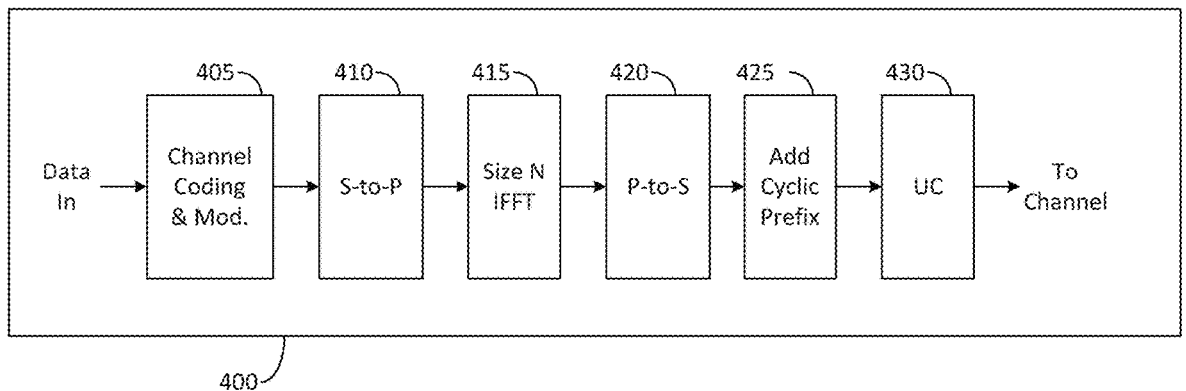
FIG. 4A illustrates a high-level diagram of an orthogonal frequency division multiple access transmit path according to embodiments of the present disclosure.
Figure 4B:
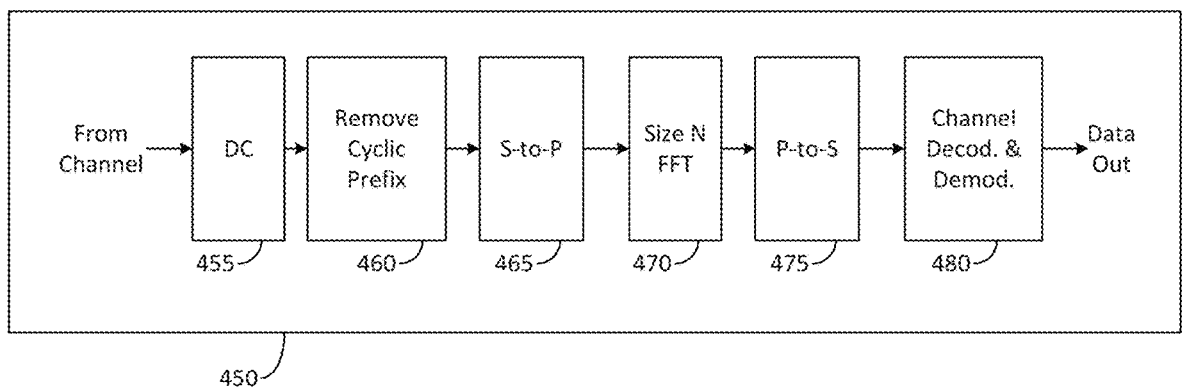
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

The 5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra-reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
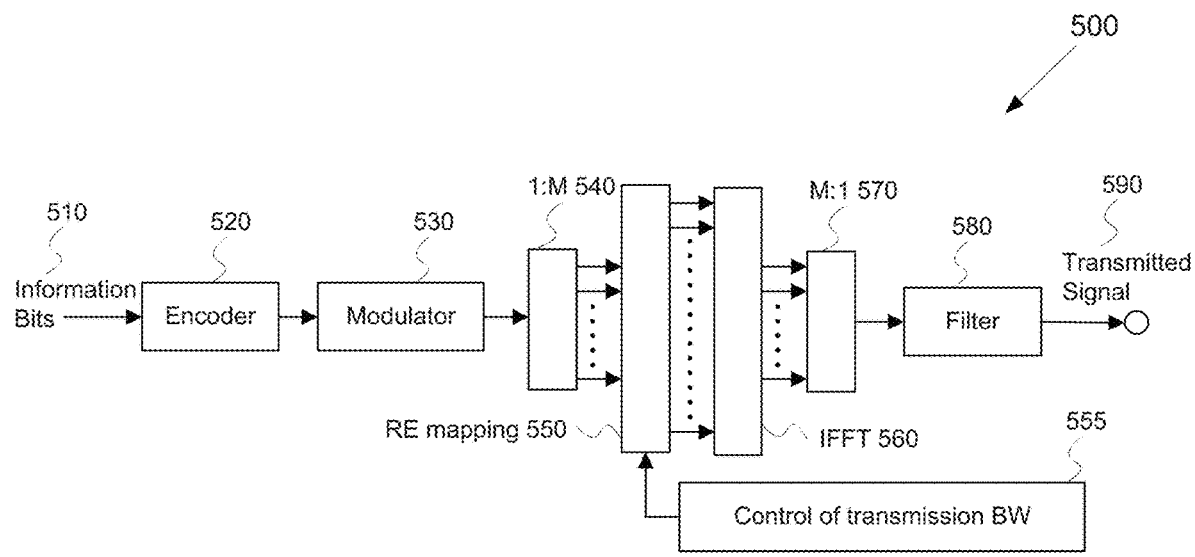
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
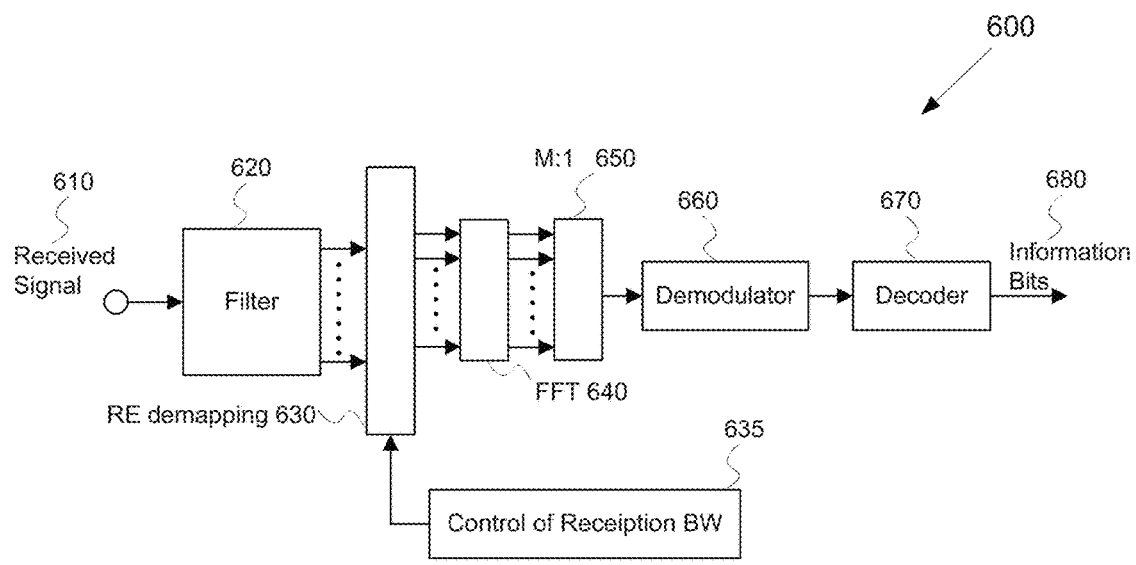
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
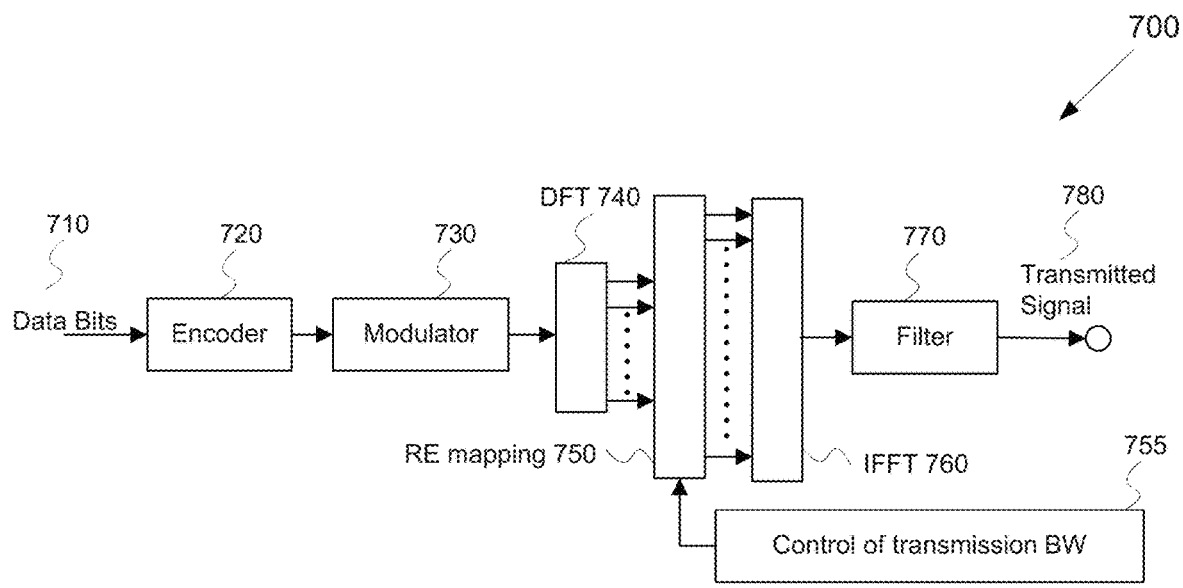
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
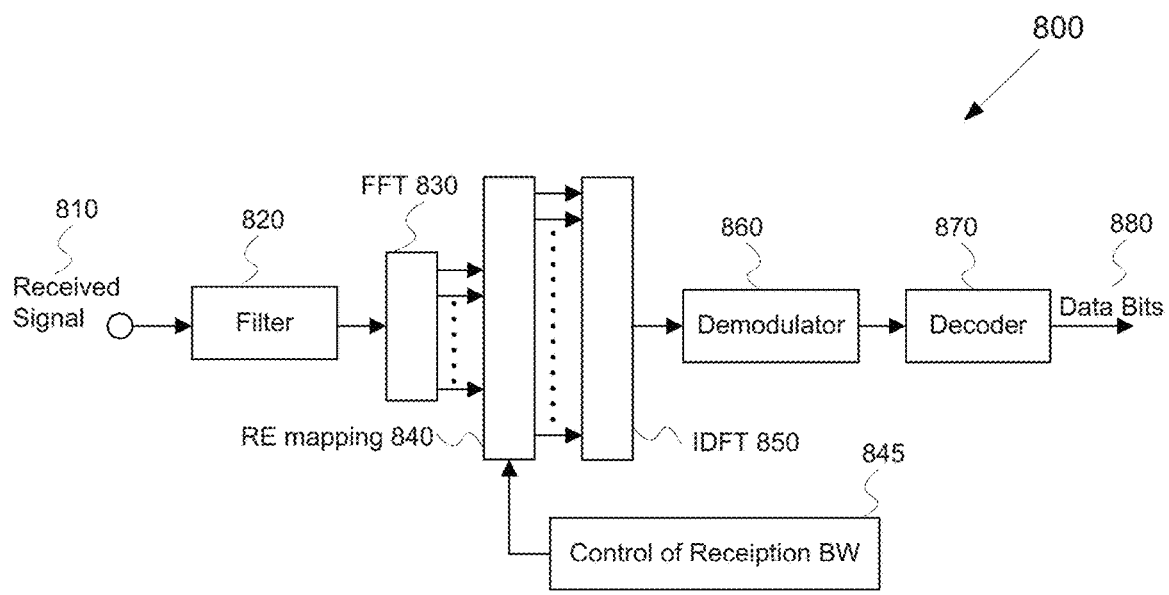
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
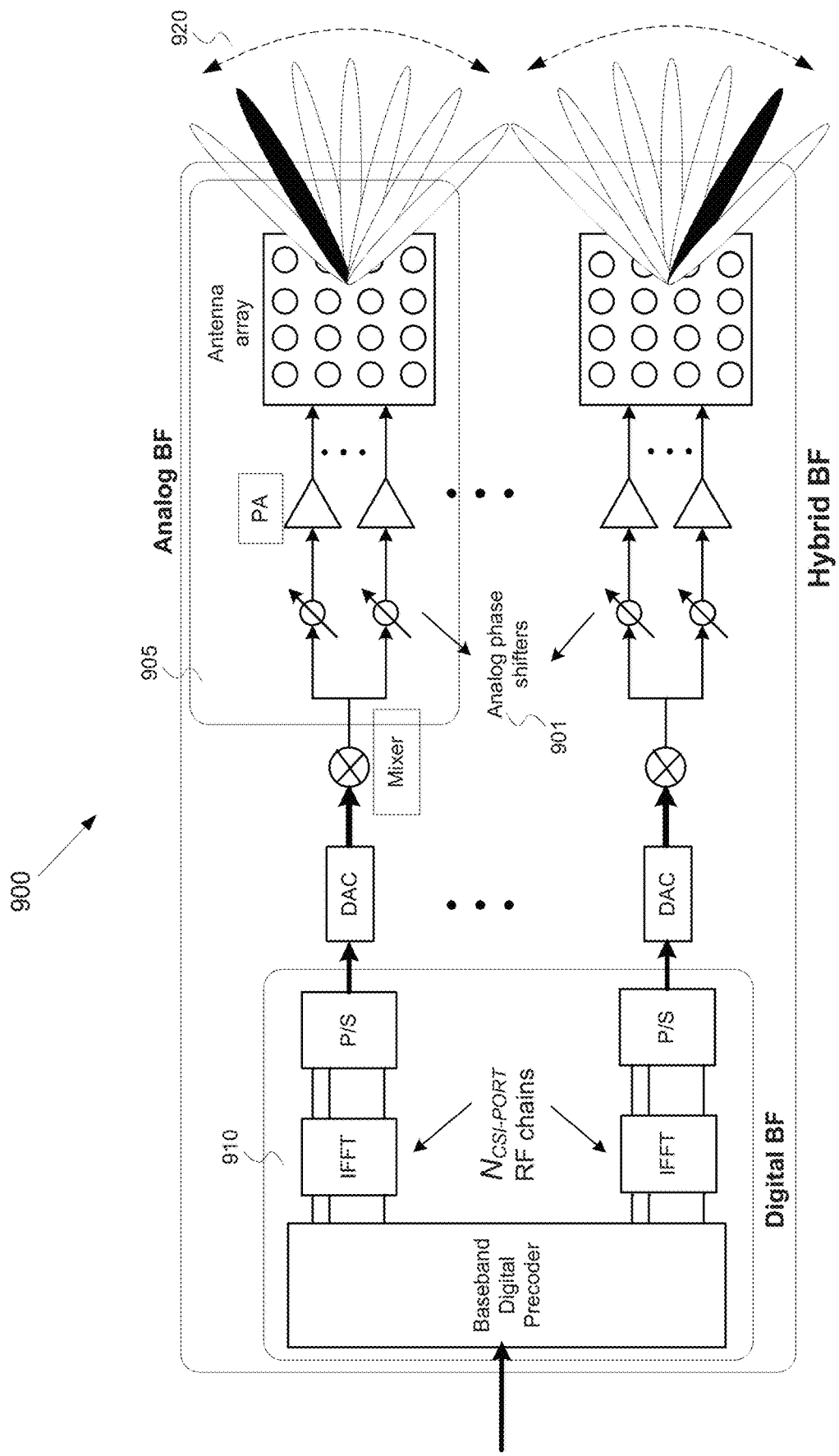
FIG. 9 illustrates an example antenna blocks according to embodiments of the present disclosure.

FIG. 9 illustrates an example antenna blocks 900 according to embodiments of the present disclosure. The embodiment of the antenna blocks 900 illustrated in FIG. 9 is for illustration only. FIG. 9 does not limit the scope of this disclosure to any particular implementation of the antenna blocks 900.

The 3GPP LTE and NR (new radio access or interface) specifications support up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles 920 by varying the phase shifter bank across symbols or subframes. The number of sub-arrays (equal to the number of RF chains) is the same as the number of CSI-RS ports NCSI-PORT. A digital beamforming unit 910 performs a linear combination across NCSI-PORT analog beams to further increase precoding gain.

While analog beams are wideband (hence not frequency-selective), digital precoding can be varied across frequency sub-bands or resource blocks. Receiver operation can be conceived analogously.

Because the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

In 3GPP LTE and NR, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems, efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE. In this case, seamless mobility is a desirable feature. Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable. For instance, the framework should be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework should be applicable whether beam sweeping (as illustrated in FIG. 9) is used or not. Third, different frequency bands and use cases impose different coverage limitations. For example, mmWave bands impose large propagation losses. Therefore, some form of coverage enhancement scheme is needed. Several candidates include beam sweeping (cf. FIG. 9), repetition, diversity, and/or multi-TRP transmission. For mMTC where transmission bandwidth is small, time-domain repetition is needed to ensure sufficient coverage.

A prerequisite to seamless access is significant reduction of higher-layer procedures for UEs which are already connected to the network. For instance, the existence of cell boundaries (or in general the notion of cells) necessitates RRC (L3) reconfiguration as a UE moves from one cell to another (i.e., inter-cell mobility). For heterogeneous networks with closed subscriber groups, additional overhead associated with higher layer procedures may further tax the system. This can be achieved by relaxing the cell boundaries thereby creating a large "super-cell" wherein a large number of UEs can roam. In this case, high capacity MIMO transmission (especially MU-MIMO) becomes more prevalent. While this presents an opportunity to increase system capacity (measured in terms of the number of sustainable UEs), it requires a streamlined MIMO design. This poses a challenge if applied in the current system.

Therefore, there is a need for an access, radio resource, and mobility management framework which facilitates seamless access by reducing the amount of higher layer procedures. In addition, there is also a need for a streamlined MIMO design that facilitates high capacity MIMO transmission.

In NR, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (and only one) assigned reference RS. A set of hypotheses or the so-called TCI states is configured via higher-layer (RRC) signaling and, when applicable, a subset of those TCI states is selected/activated via MAC CE for the TCI field code points. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

In NR, beam management was designed to share the same framework as CSI acquisition. This, however, compromises the performance of beam management especially for FR2. This is because beam management operates mainly with analog beams (characteristic of FR2) which paradigmatically differ from CSI acquisition (designed with FR1 in mind). Consequently, NR beam management becomes cumbersome and is unlikely able to keep up with more aggressive use cases which require large number of beams and fast beam switching (e.g., higher frequency bands, high mobility, and/or larger number of narrower analog beams). In addition, NR was designed to accommodate a number of unknown or rudimentary capabilities (e.g., UEs not capable of beam correspondence). To be flexible, it results in a number of options. This becomes burdensome to L1 control signaling and therefore a number of reconfigurations are performed via RRC signaling (higher-layer configuration). While this avoids L1 control overhead, it either results in high latency (if reconfiguration is performed sparsely) or imposes high usage of PDSCH (since RRC signaling consumes PDSCH resources).

In NR, the handover procedure to handle inter-cell mobility is similar to LTE, and relies heavily on RRC (and even higher layer) reconfigurations to update cell-specific parameters. These reconfigurations usually are slow, and incur large latency (up to several milliseconds). For high mobility UEs, this issue gets worse due to the need for more frequency handovers, hence more frequency RRC reconfigurations.

For high mobility UEs in FR2, the two latency issues mentioned above, one with the hierarchical NW structure (with visible cell boundaries) and the other with the beam management, compound together and make the latency issue much worse, and lead to frequent radio link failures (RLFs). Therefore, there is a need for solutions/mechanisms which can reduce RLFs for high mobility UEs in FR2. One such solution/mechanism, namely, beam management for mobility, is proposed in this disclosure.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

A "reference RS" corresponds to a set of characteristics of UL TX beam or DL RX beam, such as direction, precoding/beamforming, number of ports, etc. For instance, for UL, as the UE receives a reference RS index/ID in an UL grant, the UE applies the known characteristics of the reference RS to the granted UL transmission. The reference RS can be received and measured by the UE (in this case, the reference RS is a downlink signal such as NZP CSI-RS and/or SSB) with the result of the measurement used for calculating a beam report. As the NW/gNB receives the beam report, the NW can be better equipped with information to assign a particular UL TX beam or DL RX beam to the UE. Optionally, the reference RS can be transmitted by the UE (in this case, the reference RS is a downlink signal such as SRS or DMRS). As the NW/gNB receives the reference RS, the NW/gNB can measure and calculate the needed information to assign a particular UL TX beam or DL RX beam to the UE.

The reference RS can be dynamically triggered by the NW/gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

The following embodiment is an example of DL multi-beam operation that utilizes DL beam indication after the network (NW) receives some transmission from the UE. In the first example embodiment, aperiodic CSI-RS is transmitted by the NW and measured by the UE. Although aperiodic RS is used in these two examples, periodic or semi-persistent RS can also be used.

For mmWave (or FR2) or higher frequency bands (such as >52.6 GHz or FR4) where multi-beam operation is especially relevant, transmission-reception process includes the receiver to select a receive (RX) beam for a given TX beam. For UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RSs (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

In the present disclosure, the term "Resource Indicator", also abbreviated as REI, is used to refer to an indicator of RS resource used for signal/channel and/or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

Figure 10:
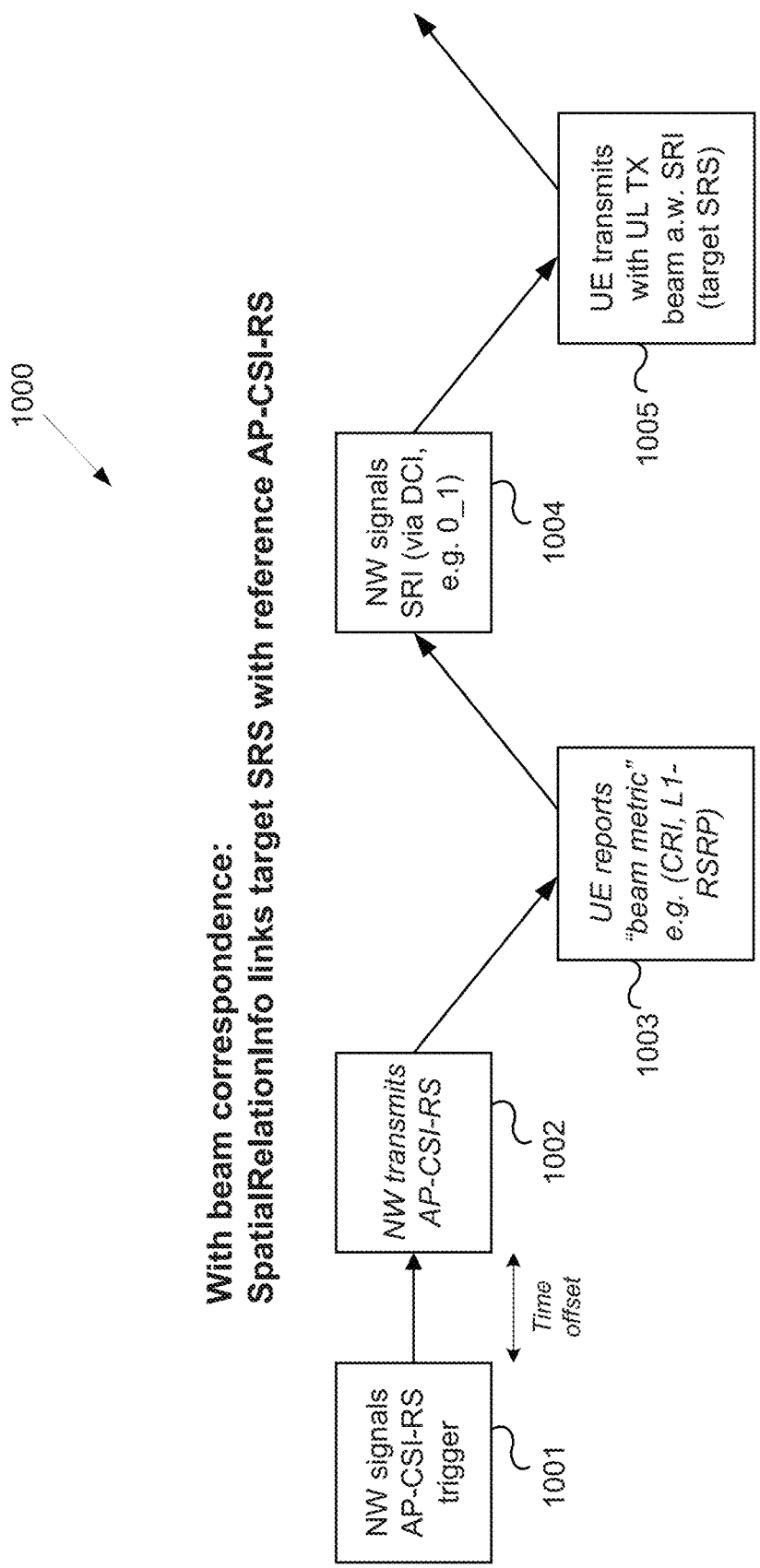
FIG. 10 illustrates an uplink multi-beam operation according to embodiments of the present disclosure.

In one example illustrated in FIG. 10, an UL multi-beam operation 1000 is shown. The embodiment of the UL multi-beam operation 1000 illustrated in FIG. 10 is for illustration only. FIG. 10 does not limit the scope of this disclosure to any particular implementation of the UL multi-beam operation 1000.

The UL multi-beam operation 1000 starts with the gNB/NW signaling to a UE an aperiodic CSI-RS (AP-CSI-RS) trigger or indication (step 1001). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the gNB/NW can use the beam report to select an UL TX beam for the UE and indicate the UL TX beam selection (step 1004) using the SRI field in the UL-related DCI (that carries the UL grant, such as DCI format 0_1 in NR). The SRI corresponds to a "target" SRS resource that is linked to a reference RS (in this case, an AP-CSI-RS) via SpatialRelationInfo configuration. Upon successfully decoding the UL-related DCI with the SRI, the UE performs UL transmission (such as data transmission on PUSCH) with the UL TX beam associated with the SRI (step 1005).

Figure 11:
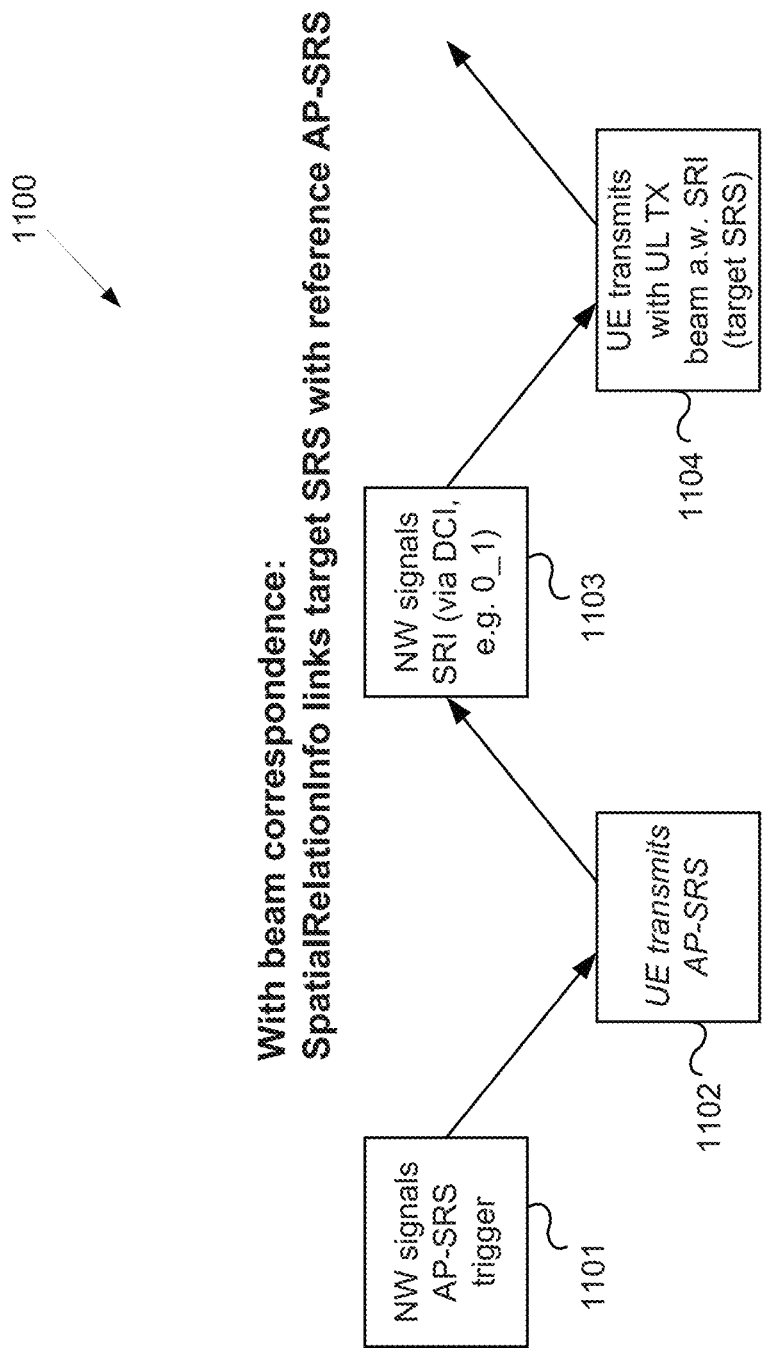
FIG. 11 illustrates an uplink multi-beam operation according to embodiments of the present disclosure.

In another example illustrated in FIG. 11, an UL multi-beam operation 1100 is shown. The embodiment of the UL multi-beam operation 1100 illustrated in FIG. 11 is for illustration only. FIG. 11 does not limit the scope of this disclosure to any particular implementation of the UL multi-beam operation 1100.

The UL multi-beam operation 1100 starts with the gNB/NW signaling to a UE an aperiodic SRS (AP-SRS) trigger or request (step 1101). This trigger can be included in a DCI (either UL-related or DL-related). Upon receiving and decoding the AP-SRS trigger, the UE transmits AP-SRS to the gNB/NW (step 1102) so that the NW (or gNB) can measure the UL propagation channel and select an UL TX beam for the UE. The gNB/NW can then indicate the UL TX beam selection (step 1103) using the SRI field in the UL-related DCI (that carries the UL grant, such as DCI format 0_1 in NR). The SRI corresponds to a "target" SRS resource that is linked to a reference RS (in this case, an AP-SRS) via SpatialRelationInfo configuration. Upon successfully decoding the UL-related DCI with the SRI, the UE performs UL transmission (such as data transmission on PUSCH) with the UL TX beam associated with the SRI (step 1104).

Figure 12:
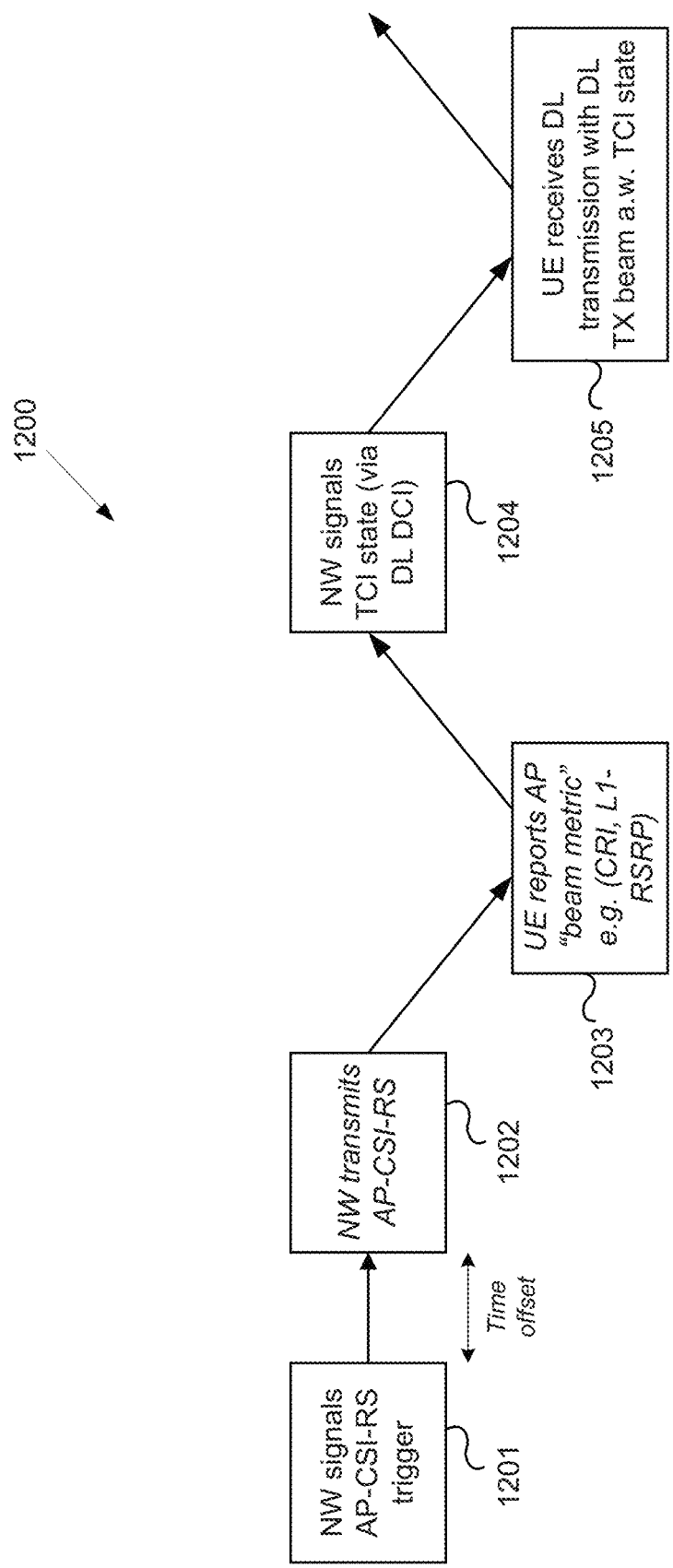
FIG. 12 illustrates a downlink multi-beam operation according to embodiments of the present disclosure.

In another example illustrated in FIG. 12, a DL multi-beam operation 1200 is shown. The embodiment of the DL multi-beam operation 1200 illustrated in FIG. 12 is for illustration only. FIG. 12 does not limit the scope of this disclosure to any particular implementation of the DL multi-beam operation 1200.

In the example illustrated in FIG. 12, where a UE is configured for measuring/receiving aperiodic CSI-RS (AP-CSI-RS) and reporting aperiodic CSI (AP CSI), a DL multi-beam operation 1200 starts with the gNB/NW signaling to a UE an aperiodic CSI-RS (AP-CSI-RS) trigger or indication (step 1201). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1202), the UE measures the AP-CSI-RS and, in turn, calculates and reports a "beam metric" (included in the CSI, indicating quality of a particular TX beam hypothesis) (step 1203). Examples of such beam reporting (supported in NR) are CSI-RS resource indicator (CRI) or SSB resource indicator (SSB-RI) coupled with its associated L1-RSRP and/or L1-SINR. Upon receiving the beam report from the UE, the NW/gNB can use the beam report to select a DL TX beam for the UE and indicate the DL TX beam selection (step 1204) using the TCI field in the DL-related DCI (that carries the DL assignment, such as DCI format 1_1 in NR). The TCI state corresponds to a reference RS (in this case, an AP-CSI-RS) defined/configured via the TCI state definition (higher-layer/RRC configured, from which a subset is activated via MAC CE for the DCI-based selection). Upon successfully decoding the DL-related DCI with the TCI field, the UE performs DL reception (such as data transmission on PDSCH) with the DL TX beam associated with the TCI field (step 1205). In this example embodiment, only one DL TX beam is indicated to the UE.

To facilitate fast beam management, one requirement is to streamline the foundational components (building blocks) for beam management. One functionality of beam management is beam selection which comprises functions such as beam measurement (including training), reporting (for DL beam management, reporting via UL control channel(s)), and indication (for DL and UL beam management, indication via DL control channel(s)). Once the building blocks are streamlined [step 1], additional advanced features to facilitate faster beam management can be added [step 2].

In U.S. patent application Ser. No. 16/949,246 filed on Oct. 21, 2020, the disclosure of which is incorporated by reference herein, a "slim mode" with streamlined designs of such foundational components [step 1] is proposed for fast beam management. The slim-mode design, due to its compact nature, can facilitate faster update/reconfiguration via lower-layer control signaling. In other words, L1 control signaling will be the primary signaling mechanism and higher-layer (such as MAC CE or RRC) is used only when necessary. Here, L1 control signaling includes the use of UE-group DCI as well as dedicated (UE-specific) DCI.

The aforementioned additional advanced features can include extensions of beam management (multi-beam operation) from intra-cell to inter-cell mobility. With such mechanism, seamless access/mobility for RRC_CONNECTED UEs—as if cell boundaries were not observed unless a UE is in initial access or initial-access-like condition—can be achieved. Another advanced feature includes mechanisms to minimize beam failure (BF) or radio link failure (RLF) such as low-overhead faster beam switching/selection and UE-initiated/event-triggered beam management. With such preventive mechanisms in place, beam failure recovery (BFR) will be less likely used.

In NR beam management (BM), the beam indication/reporting is associated with a resource ID (CRI indicating CSI-RS, SSBRI indicating SSB). The drawback of such indication/reporting is the need for more frequent update of beam indication/reporting for high speed scenarios. When the UE moves at a predictable speed and/or trajectory relative to the gNB or the NW, the beam refinement and switching over a longer period of time can be facilitated with only one DL beam indication signaling for DL (likewise, with only one UL beam indication signaling for UL). For instance, as proposed in U.S. patent application Ser. No. 17/094,580 filed on May 20, 2021, for DL (likewise for UL) beam indication, the TCI field indicates the selected TCI state wherein one TCI state is associated with a sequence of source/reference RS (port) indices representing a sequence of DL (likewise for UL) TX beams the UE assumes over a period of time. In one example, the number of reference RS indices in the sequence along with the length of the time period (possibly including periodicity and/or offset) can be configured via higher-layer signaling (RRC and/or MAC CE). This configuration can be separate or together with the TCI state definition. When receiving this indication, the UE assumes that the DL (likewise for UL) TX beam switches (or sweeps) over the period of time according to the configured sequence.

In this disclosure, more details about the components (TCI state definition, QCL assumptions, etc.), beam (reference signal) measurement, beam indication and reporting as well as the corresponding signaling mechanisms are proposed.

In the rest of the disclosure, the term "beam", can be associated a spatial transmission of a resource signal (RS) from a "port", "antenna port", or "virtual antenna/port".

If mobility profile (e.g., speed) of a UE is predictable (e.g., based on SRS at gNB or based on CSI-RS at UE), then instead of indicating a single TX beam (e.g., via DL beam indication) or reporting a single beam (via beam report), the beam indication or beam reporting can refer to a set of TX beam.

In one embodiment (1), the DL BM procedures include mechanism to facilitate indicating and/or reporting a set of DL TX beams via a single beam indication and/or beam reporting. The DL BM procedures include the following three essential steps: (S1) beam measurement, (S2) beam reporting, and (S3) beam indication.

For beam measurement (S1), a set of K reference RSs can be configured for measurement via higher-layer (such as RRC) signaling to a UE. If beam correspondence does not hold, the K reference RSs can be NZP CSI-RS, SSB, DL DMRS, or any combination of those. For example, this set can be composed of NZP CSI-RS and SSB. Or it can be composed of NZP CSI-RS only. Or it can be composed of SSB only. If beam correspondence holds, the K reference RSs can be NZP CSI-RS, SSB, DL DMRS, SRS, UL DMRS, or any combination of those. Each reference RS can be associated with a resource ID of the particular type of RS. Optionally, each reference RS can also be associated with an entity ID of a particular type of radio resource (RR) entity, which the reference RS belongs to (or transmitted from). A few examples of the RR entity include at least one or a combination of cell, transmit-receive point (TRP), antenna panel, resource set, and port.

In one example, a reference RS can be associated with a TX beam or spatial domain filter, which NW/gNB (for DL RS) or UE (for UL RS) uses to beamform/precode the reference RS before its transmission. The choice of the TX beam or spatial domain filter is up to the NW/gNB (for DL RS) or UE (for US RS).

At least one of the following alternatives can be used for beam reporting (S2) and DL beam indication (S3).

In one alternative Alt 1.1, both beam reporting (S2) and DL beam indication (S3) correspond to a single DL TX beam (similar to NR BM). For beam reporting (S2), the UE is configured to use a subset or all of the configured K reference RSs to determine one beam report comprising a beam metric and/or a resource indicator. For beam indication (S3), the NR TCI-based mechanism can be reused. The TCI-based mechanism links/associates one of the K reference RSs to a particular TCI state for a channel (or another/target RS). Such association can take form of the QCL TypeD, which represents a spatial relation or spatial domain filter (or beam or precoder).

In one alternative Alt 1.2, beam reporting (S2) corresponds to a single DL TX beam (similar to NR BM), and DL beam indication (S3) corresponds to a set of M>1 DL TX beams m=0, 1, 2, . . . , M−1. For beam reporting (S2), the procedures as in Alt 1.1 is used. For beam indication (S3), the NR 16 TCI-based mechanism can be reused to link/associate M out of the K reference RSs to a particular TCI state for a channel (or another/target RS). Such association can take form of the QCL TypeD, which represents a spatial relation or spatial domain filter (or beam or precoder).

In one alternative Alt 1.3, beam reporting (S2) corresponds to a set of N>1 DL TX beams n=0, 1, 2, . . . , N−1, and DL beam indication (S3) corresponds to a single DL TX beam (similar to Rel. 15/16 BM). For beam indication (S3), the procedures as in Alt 1.1 is used. For beam reporting (S2), the UE is configured to use a subset or all of the configured K reference RSs to determine N beam reports, where each beam report comprises a beam metric and/or a resource indicator.

In one alternative Alt 1.4, beam reporting (S2) corresponds to a set of N>1 DL TX beams n=0, 1, 2, ..., N−1, and DL beam indication (S3) corresponds to a set of M>1 DL TX beams m=0, 1, 2, ..., M−1. For beam reporting (S2), the UE is configured to use a subset or all of the configured K reference RSs to determine N beam reports, where each beam report comprises a beam metric and/or a resource indicator. For beam indication (S3), the NR TCI-based mechanism can be reused to link/associate M out of the K reference RSs to a particular TCI state for a channel (or another/target RS). Such association can take form of the QCL TypeD, which represents a spatial relation or spatial domain filter (or beam or precoder).

In one example, the beam metric is a L1-RSRP which indicates power level of a reference RS. In another example, the beam metric is a L1-SINR which indicates a ratio of signal power and (noise plus) interference power, where the signal power is determined using a reference RS and the interference power is determined using a ZP CSI-RS resource and/or NZP CSI-RS resource configured to the UE for interference measurement. In one example, the resource indicator is a CRI indicating a CSI-RS resource. In another example, the resource indicator is a SSBRI indicating a SSB resource. In another example, the resource indicator is a SRI indicating a SRS resource. In one example, the resource indicator indicates both a reference RS and an RR entity that the reference RS belongs to or transmitted from (cf. for BM management based intra- or inter-cell mobility scenarios).

For DL beam indication, two relevant channels include PDSCH and PDCCH (and example of another/target RS include DL DMRS, CSI-RS, SSB, SRS, UL DMRS). Similar to NR, a set of TCI states can be configured via higher-layer (RRC) signaling. Optionally, a set of TCI states can be configured via MAC CE. Optionally, a subset of the TCI states can be activated or selected either via MAC CE or L1 control signaling (via either UE-group DCI where a set of UEs share a same TCI state subset, or UE-specific/dedicated DCI). This subset constitutes the TCI states represented by the code points of the TCI field in the corresponding DCI. This update/activation can be performed in either one shot or incrementally. The TCI state indicated by the code point of the TCI field is a reference to the TX beam or the TX spatial filter associated with a reference RS. For DL, given such a reference, the UE can further derive the RX beam or RX spatial filter. The DCI that includes the TCI field (which can be either DL-related DCI or UL-related DCI) performs the function of the so-called "beam indication".

Figure 13:
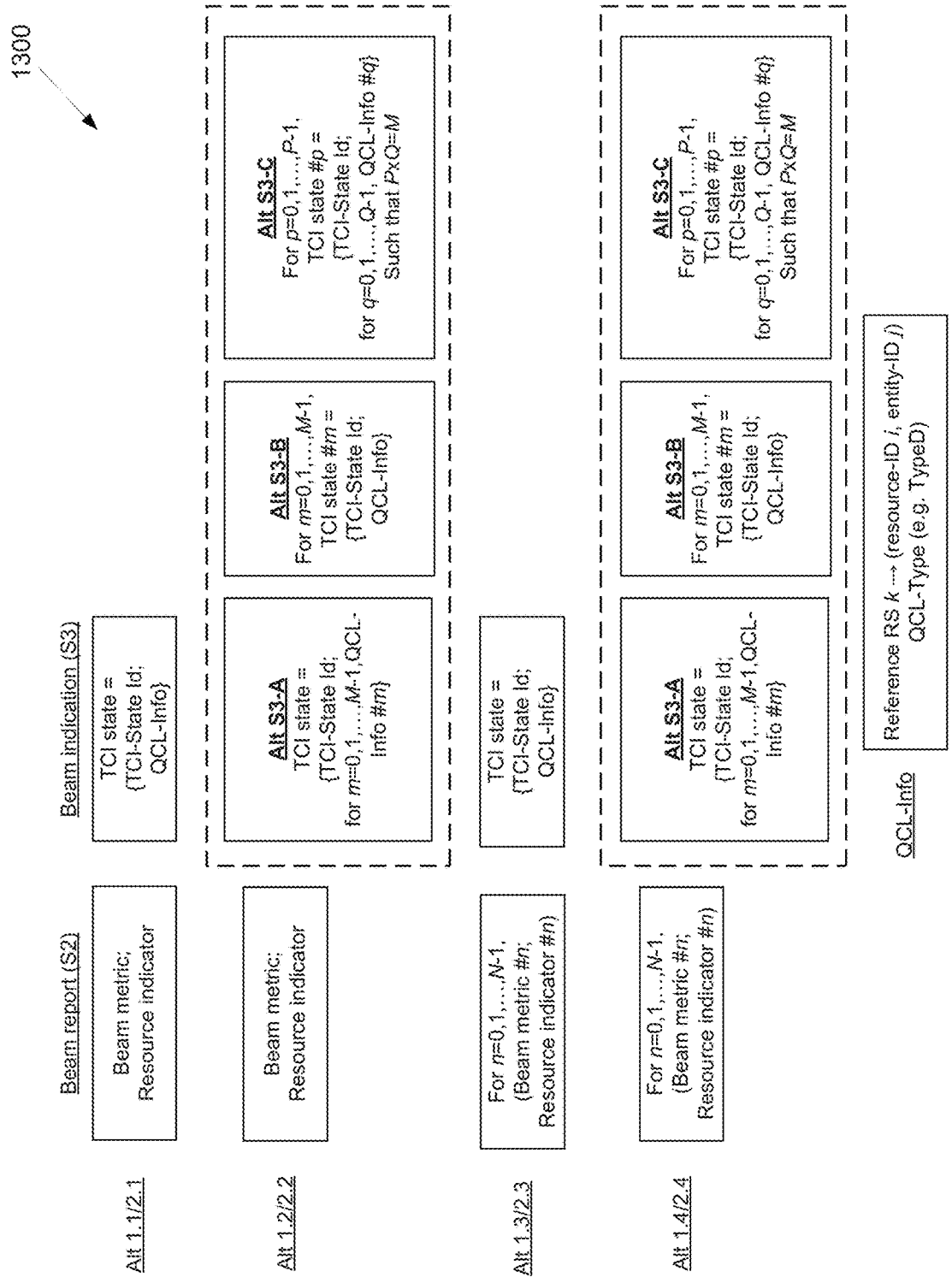
FIG. 13 illustrates examples of TCI states according to embodiments of the present disclosure.

FIG. 13 illustrates beam reporting and beam indication according to Alt 1.1 through Alt 1.4, wherein for Alt 1.1 and Alt 1.3, a TCI state includes a TCI state ID and a QCL-Info parameter indicating a single DL TX beam. For Alt 1.2 and Alt 1.4, three alternatives are provided for M>1 DL TX beam indication.

In one alternative Alt S3-A: a TCI state includes a TCI state ID and a set of QCL-Info parameters for M DL TX beams.
In one alternative Alt S3-B: a set of TCI states where each TCI state includes a TCI state ID and a QCL-Info parameter indicating a single DL TX beam.
In one alternative Alt S3-C: a set of P TCI states where each TCI state includes a TCI state ID and a set of QCL-Info parameters for Q DL TX beams, and P×Q=M.

A QCL-Info parameter includes a resource ID, and optionally, an entity ID (e.g., cell ID) of a reference RS (from K reference RSs), and a QCL-Type, e.g., QCL TypeD.

In one example, N=M, where N is fixed or configured via higher layer (RRC) or reported by the UE. In another example, N≠M, where at least one of the following examples is used for N and M.

In one example 1-1, both N and M are fixed.
In one example 1-2, both N and M are configured via higher layer (RRC).
In one example 1-3, both N and M are reported by the UE.
In one example 1-4, N is fixed and M is configured via higher layer (RRC).
In one example 1-5, N is fixed and M is reported by the UE.
In one example 1-6, N is configured via higher layer (RRC) and M is fixed.
In one example 1-7, N is configured via higher layer (RRC) and M is reported by the UE.
In one example 1-8, N is reported by the UE and M is fixed.
In one example 1-9, N is reported by the UE and M is configured via higher layer (RRC).
In one example 1-10, M is fixed and N is configured via higher layer (RRC).
In one example 1-11, M is fixed and N is reported by the UE.
In one example 1-12, M is configured via higher layer (RRC) and N is fixed.
In one example 1-13, M is configured via higher layer (RRC) and N is reported by the UE.
In one example 1-14, M is reported by the UE and N is fixed.
In one example 1-15, M is reported by the UE and N is configured via higher layer (RRC).

A few sub-embodiments of this embodiment, for the beam reporting (S2) over a longer period of time are as follows.

In one sub-embodiment (1.1.1), a UE is configured with a beam reporting indicating a set of N DL TX beams (cf. Alt 1.3 and Alt 1.4) where the beam reporting is performed in an aperiodic manner. In one example, the beam reporting is triggered via DL-related DCI. In one example, the beam reporting is triggered via UL-related DCI. The beam reporting corresponds to a burst of N beams n=0, 1, ..., N−1 such that over a period of time, the DL TX beam can change from n=0 to n=N−1 according to a pattern (sequence), which can be fixed or reported together with the beam reporting or configured. In one example, the set of N DL TX beams can represent a wider DL TX beam (e.g., N narrow beams can be associated with a wide beam) for control channel (PDCCH). For data channel (PDSCH), however, the DL TX beam will be one of the N DL TX beams. In one example, the DL TX beams for both control (PDCCH) and data (PDSCH) are the same, which is one of the N DL TX beams.

In one sub-embodiment (1.1.2), a UE can initiate (or can be configured to initiate, e.g., based on L1 events such as beam failure detection) a beam reporting indicating a set of N DL TX beams (cf. Alt 1-3 and Alt 1.4) where the initiated beam reporting corresponds to an aperiodic report. Some of details about UE-initiated beam report/indication can be found in U.S. patent application Ser. No. 16/946,915 filed on Feb. 11, 2021. The beam reporting corresponds to a burst of N beams n=0, 1, ..., N−1 such that over a period of time, the DL TX beam can change from n=0 to n=N−1 according to a pattern (sequence), which can be fixed or reported together with the beam reporting or configured. In one example, the set of N DL TX beams can represent a wider DL TX beam (e.g., N narrow beams can be associated with a wide beam) for control channel (PDCCH). For data channel (PDSCH), however, the DL TX beam will be one of the N DL TX beams. In one example, the DL TX beams for both control (PDCCH) and data (PDSCH) are the same, which is one of the N DL TX beams.

In one sub-embodiment (1.1.3), a UE is configured with a beam reporting indicating a set of N DL TX beams (cf. Alt 1.3 and Alt 1.4) where the beam reporting is performed in a semi-persistent manner. In one example, the semi-persistent beam reporting is activated or deactivated based on a MAC CE based activation or deactivation command, respectively. When activated, the UE reports a set of N DL TX beams in a periodic manner. The UE stops periodic beam reporting after receiving a deactivation command. With such a beam reporting mechanism, the beam reporting can be performed sparingly. The gNB can infer (interpolate) DL TX beams between two such beam reporting instances via, e.g., an interpolated pattern, which can be fixed, reported together with the beam reporting or configured. In one example, the set of N DL TX beams can represent a wider DL TX beam (e.g., N narrow beams can be associated with a wide beam) for control channel (PDCCH). For data channel (PDSCH), however, the DL TX beam will be one of the N DL TX beams. In one example, the DL TX beams for both control (PDCCH) and data (PDSCH) are the same, which is one of the N DL TX beams.

A few sub-embodiments of this embodiment, for the beam indication over a longer period of time are as follows.

Figure 14:
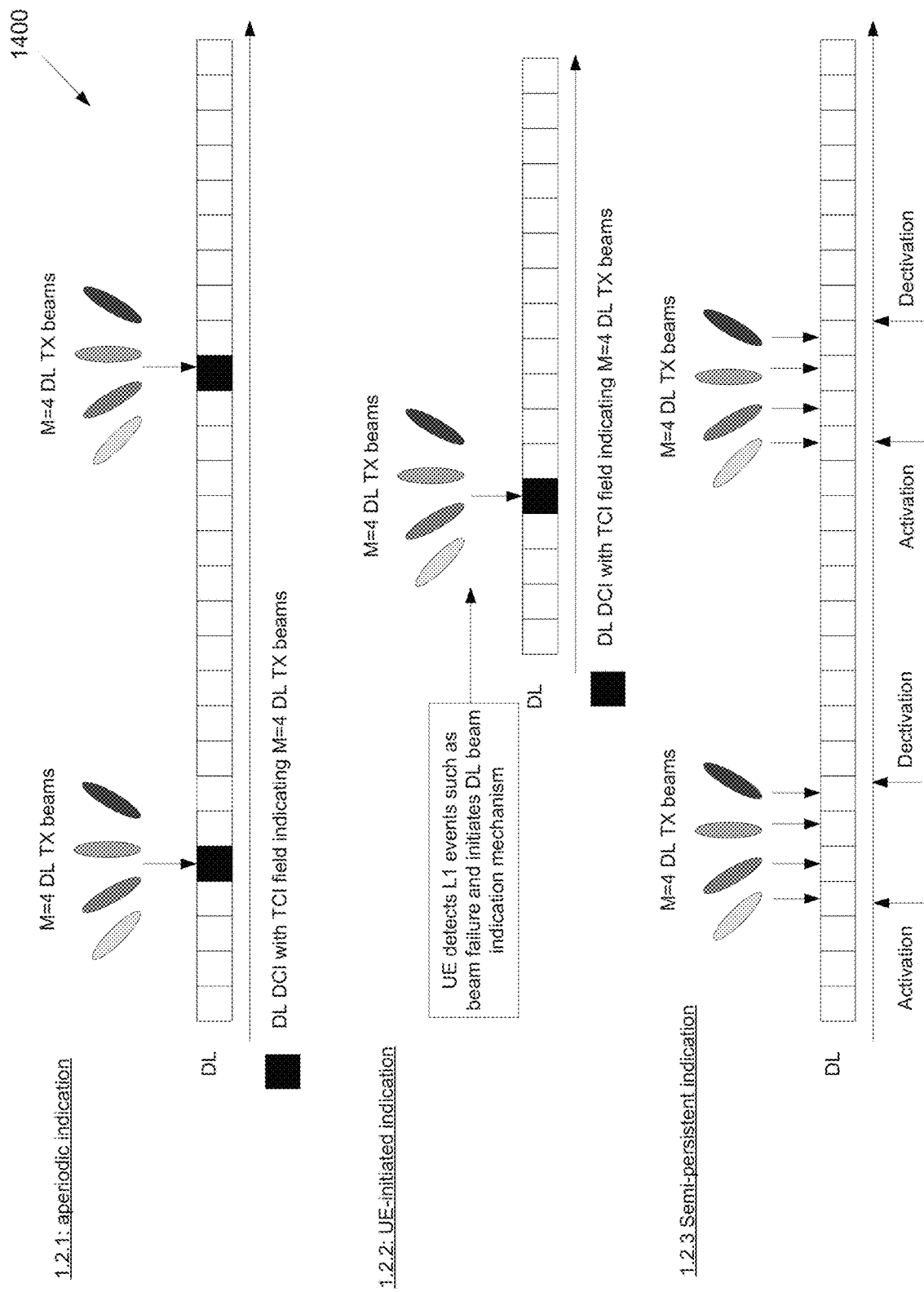
FIG. 14 illustrates beam indication mechanisms according to embodiments of the present disclosure.

FIG. 14 illustrates example beam indication mechanisms 1400. The embodiment of the example beam indication mechanisms 1400 illustrated in FIG. 14 is for illustration only. FIG. 14 does not limit the scope of this disclosure to any particular implementation of the example beam indication mechanisms 1400.

In one sub-embodiment (1.2.1), a UE is configured with a beam indication indicating a set of M DL TX beams (cf. Alt 1-2 and Alt 1.4) where the beam indication is performed in an aperiodic manner. In one example, the beam indication is performed via a TCI state included as a code-point in DL-related DCI. In one example, the beam indication is performed via a TCI state included as a code-point in UL-related DCI. In one example, the indicated code-point is selected from a set of TCI states configured via higher layer (RRC). In another example, the indicated code-point is selected from a set of TCI states configured via MAC CE activation command, where the set of TCI states can be selected from a larger set of TCI states configured via higher layer (RRC). In this case, the beam indication corresponds to a burst of M beams m=0, 1, . . . , M−1 such that over a period of time, the DL TX beam can change from m=0 to m=M−1 according to a pattern (sequence), which can be fixed, reported together with the beam reporting or configured. In one example, the set of M DL TX beams can represent a wider DL TX beam for control channel (PDCCH). For data channel (PDSCH), however, the DL TX beam will be one of the M DL TX beams. In one example, the DL TX beams for both control (PDCCH) and data (PDSCH) are the same, which is one of the M DL TX beams. An illustration of the DL beam indication according to this embodiment is shown in FIG. 14.

In one sub-embodiment (1.2.2), a UE can initiate (or can be configured to initiate, e.g., based on L1 events such as beam failure detection) a beam indication mechanism indicating a set of M DL TX beams (cf. Alt 1.2 and Alt 1.4) where the initiated beam indication corresponds to an aperiodic indication. Some of details about UE-initiated beam report/indication can be found in U.S. patent application Ser. No. 16/946,915 filed on Feb. 11, 2021. The beam indication corresponds to a burst of M beams m=0, 1, . . . , M−1 such that over a period of time, the DL TX beam can change from m=0 to m=M−1 according to a pattern (sequence), which can be fixed, reported together with the beam reporting or configured. In one example, the set of M DL TX beams can represent a wider DL TX beam for control channel (PDCCH). For data channel (PDSCH), however, the DL TX beam will be one of the M DL TX beams. In one example, the DL TX beams for both control (PDCCH) and data (PDSCH) are the same, which is one of the M DL TX beams. An illustration of the DL beam indication according to this embodiment is shown in FIG. 14.

In one sub-embodiment (1.2.3), a UE is configured with a beam indication indicating a set of M DL TX beams (cf. Alt 1.2 and Alt 1.4) where the beam indication is performed in a semi-persistent manner. In one example, the semi-persistent beam indication is activated or deactivated based on a MAC CE based activation or deactivation command, respectively. When activated, the UE is indicated with a set of M DL TX beams in a periodic manner. The beam indication is deactivated based on a deactivation command. With such a beam indication mechanism, the beam indication can be performed sparingly. The UE can infer (interpolate) DL TX beams between two such beam indication instances via, e.g., an interpolated pattern, which can be fixed, reported together with the beam reporting or configured. In one example, the set of M DL TX beams can represent a wider DL TX beam for control channel (PDCCH). For data channel (PDSCH), however, the DL TX beam will be one of the M DL TX beams. In one example, the DL TX beams for both control (PDCCH) and data (PDSCH) are the same, which is one of the M DL TX beams. An illustration of the DL beam indication according to this embodiment is shown in FIG. 14.

Figure 15:
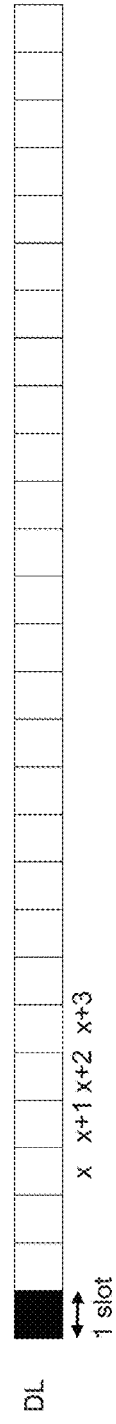
FIG. 15 illustrates beam indication mechanisms according to embodiments of the present disclosure.
Figure 15:
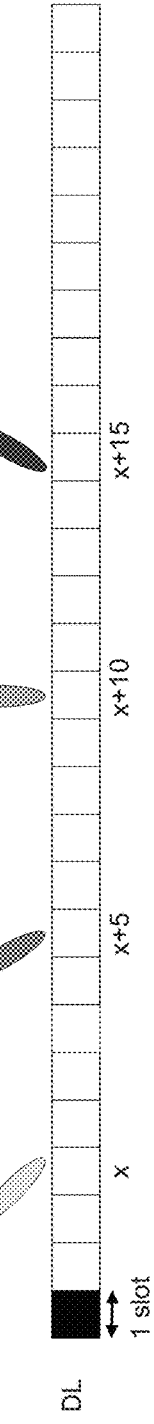

FIG. 15 illustrates example beam indication mechanisms 1500. The embodiment of the example beam indication mechanisms 1500 illustrated in FIG. 15 is for illustration only. FIG. 15 does not limit the scope of this disclosure to any particular implementation of the example beam indication mechanisms 1500.

In one sub-embodiment (1.2.4), a UE is configured with a beam indication indicating a set of M DL TX beams, e.g., as in sub-embodiments 1.2.1, 1.2.2, and 1.2.3 (e.g., via a TCI state mechanism), wherein the beam indication is a function of the (time) slot/subframe.

In one example 1.2.4.1, DL TX beam #0 is indicated for a DL slot/subframe x, DL TX beam #1 is indicated for a DL slot/subframe x+1, DL TX beam #2 is indicated for a DL slot/subframe x+2, and so on.

In one example 1.2.4.2, DL TX beam #0 is indicated for DL slots/subframes x, x+1, . . . , x+y−1, DL TX beam #1 is indicated for DL slots/subframes x+y, x+y+1, . . . , x+2y−1, DL TX beam #2 is indicated for a DL slots/subframes x+2y, x+2y+1, . . . , x+3y−1, and so on.

Here, x is a reference slot/subframe and y is a slot/subframe offset for DL beam switching. In one example, x can be fixed. Alternatively, x can be a function of UE speed. Alternatively, x can be configured. Alternatively, x can be reported by the UE. In another example, y can be fixed. Alternatively, y can be a function of UE speed. Alternatively, y can be configured. Alternatively, y can be reported by the UE. An illustration of the DL TX beams for the two examples is shown in FIG. 15.

In one example, the NR mechanism for DL slot indication can be used (or extended) to indicate M slots or M groups of DL slots for which M DL TX beams are indicated via the TCI indication. For example, the parameter TDD-UL-DL-ConfigDedicated included in the information element (IE) TDD-UL-DL-Config can be used to indicate/configure the DL slot indices. In particular, the parameter slotIndex (bold highlighted below) provided via TDD-UL-DL-ConfigDedicated can be used for this purpose, where slotIndex identifies a slot within a dl-UL-Transmission Periodicity (given in tdd-UL-DL-configuration Common).

```
TDD-UL-DL-ConfigDedicated ::=         SEQUENCE {
    slotSpecificConfigurationsToAddModList    SEQUENCE (SIZE (1..maxNrofSlots)) OF
TDD-UL-DL-SlotConfig           OPTIONAL, -- Need N
    slotSpecificConfigurationsToreleaseList   SEQUENCE (SIZE (1..maxNrofSlots)) OF
TDD-UL-DL-SlotIndex            OPTIONAL, -- Need N
    ...
}
TDD-UL-DL-SlotConfig ::=              SEQUENCE {
    slotIndex                  TDD-UL-DL-SlotIndex,
    symbols                    CHOICE {
        allDownlink                NULL,
        allUplink                  NULL,
        explicit                   SEQUENCE {
            nrofDownlinkSymbols                INTEGER (1..maxNrofSymbols-1)
OPTIONAL, -- Need S
            nrofUplinkSymbols                  INTEGER (1..maxNrofSymbols-1)
OPTIONAL -- Need S
        }
    }
}
TDD-UL-DL-SlotIndex ::=               INTEGER (0..maxNrofSlots-1)
```

For instance, if slot indexing is according to Ex 1.2.4.1 (explained above), then slotIndex=x+m for m=0, 1, ..., M−1, where x is a reference slot/subframe. If slot indexing is according to Ex 1.2.4.2 (explained above), then slotIndex=x+m×y for m=0, 1, ..., M−1, where x is a reference slot/subframe and y is a slot/subframe offset for DL beam switching.

In one embodiment (2), the UL BM procedures include mechanism to facilitate indicating and/or reporting a set of UL TX beams via a single beam indication and/or beam reporting. Similar to DL (cf. embodiment 1), the UL BM procedures include the following three essential steps: (S1) beam measurement, (S2) beam reporting, and (S3) beam indication.

For beam measurement (S1), a set of K reference RSs can be configured for measurement via higher-layer (such as RRC) signaling to a UE. If beam correspondence does not hold, the K reference RSs can be SRS, UL DMRS, or any combination of those. For example, this set can be composed of SRS only. Or it can be composed of UL DMRS only. Or it can be composed of a combination of SRS and UL DMRS. If beam correspondence holds, the K reference RSs can be NZP CSI-RS, SSB, DL DMRS, SRS, UL DMRS, or any combination of those. Each reference RS can be associated with a resource ID of the particular type of RS. Optionally, each reference RS can also associated with an entity ID of a particular type of radio resource (RR) entity, which the reference RS belongs to (or transmitted from). A few examples of the RR entity include at least one or a combination of UL entities such as antenna panel, resource set, and port.

In one example, a reference RS can be associated with a TX beam or spatial domain filter, which NW/gNB (for DL RS) or UE (for UL RS) uses to beamform/precode the reference RS before its transmission. The choice of the TX beam or spatial domain filter is up to the NW/gNB (for DL RS) or UE (for US RS).

At least one of the following alternatives can be used for beam reporting (S2) and UL beam indication (S3).

In one alternative Alt 2.1, both beam reporting (S2) and UL beam indication (S3) correspond to a single UL TX beam (similar to NR BM). For beam reporting (S2), the UE is configured to use a subset or all of the configured K reference RSs to determine one beam report comprising a beam metric and/or a resource indicator. For UL beam indication (S3), the NR TCI-based mechanism can be reused. The TCI-based mechanism links/associates one of the K reference RSs to a particular TCI state for a channel (or another/target RS). Such association can take form of the QCL TypeD, which represents a spatial relation or spatial domain filter (or beam or precoder).

In one alternative Alt 2.2, beam reporting (S2) corresponds to a single UL TX beam (similar to Rel. 15/16 BM), and UL beam indication (S3) corresponds to a set of M>1 UL TX beams m=0, 1, 2, ..., M−1. For beam reporting (S2), the procedures as in Alt 2.1 is used. For beam indication (S3), the NR TCI-based mechanism can be reused to link/associate M out of the K reference RSs to a particular TCI state for a channel (or another/target RS). Such association can take form of the QCL TypeD, which represents a spatial relation or spatial domain filter (or beam or precoder).

In one alternative Alt 2.3, beam reporting (S2) corresponds to a set of N>1 UL TX beams n=0, 1, 2, ..., N−1, and UL beam indication (S3) corresponds to a single UL TX beam (similar to NR BM). For beam indication (S3), the procedures as in Alt 2.1 is used. For beam reporting (S2), the UE is configured to use a subset or all of the configured K reference RSs to determine N beam reports, where each beam report comprises a beam metric and/or a resource indicator.

In one alternative Alt 2.4, beam reporting (S2) corresponds to a set of N>1 UL TX beams n=0, 1, 2, ..., N−1, and UL beam indication (S3) corresponds to a set of M>1 UL TX beams m=0, 1, 2, ..., M−1. For beam reporting (S2), the UE is configured to use a subset or all of the configured K reference RSs to determine N beam reports, where each beam report comprises a beam metric and/or a resource indicator. For beam indication (S3), the NR TCI-based mechanism can be reused to link/associate M out of the K reference RSs to a particular TCI state for a channel (or another/target RS). Such association can take form of the QCL TypeD, which represents a spatial relation or spatial domain filter (or beam or precoder).

In one example, the beam metric is a L1-RSRP which indicates power level of a reference RS. In another example, the beam metric is a L1-SINR which indicates a ratio of signal power and (noise plus) interference power, where the signal power is determined using a reference RS and the interference power is determined using a ZP CSI-RS resource and/or NZP CSI-RS resource configured to the UE for interference measurement. In one example, the resource indicator is a CRI indicating a CSI-RS resource. In another example, the resource indicator is a SSBRI indicating a SSB resource. In another example, the resource indicator is a SRI indicating a SRS resource. In one example, the resource indicator indicates both a reference RS and an RR entity that the reference RS belongs to or transmitted from (cf. for BM management based intra- or inter-cell mobility scenarios).

For UL beam indication, three relevant channels include PRACH, PUSCH, and PUCCH (an example of another/target RS include UL DMRS, CSI-RS, SSB, SRS, UL DMRS). Similar to NR, a set of TCI states can be configured via higher-layer (RRC) signaling. Optionally, a set of TCI states can be configured via MAC CE. Optionally, a subset of the TCI states can be activated or selected either via MAC CE or L1 control signaling (via either UE-group DCI where a set of UEs share a same TCI state subset, or UE-specific/dedicated DCI). This subset constitutes the TCI states represented by the code points of the TCI field in the corresponding DCI. This update/activation can be performed in either one shot or incrementally. The TCI state indicated by the code point of the TCI field is a reference to the TX beam or the TX spatial filter associated with a reference RS. For UL, given such a reference, the UE can further derive the RX beam or RX spatial filter. The DCI that includes the TCI field (which can be either DL-related DCI or UL-related DCI) performs the function of the so-called "beam indication".

FIG. 13 illustrates beam reporting and beam indication according to Alt 2.1 through Alt 2.4, wherein for Alt 2.1 and Alt 2.3, a TCI state includes a TCI state ID and a QCL-Info parameter indicating a single UL TX beam. For Alt 2.2 and Alt 2.4, three alternatives are provided for M>1 UL TX beam indication.

Alt S3-A: a TCI state includes a TCI state ID and a set of QCL-Info parameters for M UL TX beams.

Alt S3-B: a set of TCI states where each TCI state includes a TCI state ID and a QCL-Info parameter indicating a single UL TX beam.

Alt S3-C: a set of P TCI states where each TCI state includes a TCI state ID and a set of QCL-Info parameters for Q UL TX beams, and P×Q=M.

A QCL-Info parameter includes a resource ID, and optionally, an entity ID (e.g., cell ID) of a reference RS (from K reference RSs), and a QCL-Type, e.g., QCL TypeD.

In one example, N=M, where N is fixed or configured via higher layer (RRC) or reported by the UE. In another example, N+M, where at least of example 1-1 through 1-15 is used for N and M.

A few sub-embodiments of this embodiment, for the beam reporting (S2) over a longer period of time are as follows.

In one sub-embodiment (2.1.1), a UE is configured with a beam reporting indicating a set of N UL TX beams (cf. Alt 1-3 and Alt 1.4) where the beam reporting is performed in an aperiodic manner. In one example, the beam reporting is triggered via DL-related DCI. In one example, the beam reporting is triggered via UL-related DCI. The beam reporting corresponds to a burst of N beams n=0, 1, ..., N−1 such that over a period of time, the UL TX beam can change from n=0 to n=N−1 according to a pattern (sequence), which can be fixed or reported together with the beam reporting or configured. In one example, the set of N UL TX beams can represent a wider UL TX beam (e.g., N narrow beams can be associated with a wide beam) for control channel (PDCCH). For data channel (PDSCH), however, the UL TX beam will be one of the N UL TX beams. In one example, the UL TX beams for both control (PDCCH) and data (PDSCH) are the same, which is one of the N UL TX beams.

In one sub-embodiment (2.1.2), a UE can initiate (or can be configured to initiate, e.g., based on L1 events such as beam failure detection) a beam reporting indicating a set of N UL TX beams (cf. Alt 1-3 and Alt 1.4) where the initiated beam reporting corresponds to an aperiodic report. Some of details about UE-initiated beam report/indication can be found in U.S. patent application Ser. No. 16/946,915 filed on Feb. 11, 2021. The beam reporting corresponds to a burst of N beams n=0, 1, ..., N−1 such that over a period of time, the UL TX beam can change from n=0 to n=N−1 according to a pattern (sequence), which can be fixed or reported together with the beam reporting or configured. In one example, the set of N UL TX beams can represent a wider UL TX beam (e.g., N narrow beams can be associated with a wide beam) for control channel (PDCCH). For data channel (PDSCH), however, the UL TX beam will be one of the N UL TX beams. In one example, the UL TX beams for both control (PDCCH) and data (PDSCH) are the same, which is one of the N UL TX beams.

In one sub-embodiment (2.1.3), a UE is configured with a beam reporting indicating a set of N UL TX beams (cf. Alt 1-3 and Alt 1.4) where the beam reporting is performed in a semi-persistent manner. In one example, the semi-persistent beam reporting is activated or deactivated based on a MAC CE based activation or deactivation command, respectively. When activated, the UE reports a set of N UL TX beams in a periodic manner. The UE stops periodic beam reporting after receiving a deactivation command. With such a beam reporting mechanism, the beam reporting can be performed sparingly. The gNB can infer (interpolate) UL TX beams between two such beam reporting instances via, e.g., an interpolated pattern, which can be fixed, reported together with the beam reporting or configured. In one example, the set of N UL TX beams can represent a wider UL TX beam (e.g., N narrow beams can be associated with a wide beam) for control channel (PDCCH). For data channel (PDSCH), however, the UL TX beam will be one of the N UL TX beams. In one example, the UL TX beams for both control (PDCCH) and data (PDSCH) are the same, which is one of the N UL TX beams.

A few sub-embodiments of this embodiment, for the beam indication over a longer period of time are as follows.

In one sub-embodiment (2.2.1), a UE is configured with a beam indication indicating a set of M UL TX beams (cf. Alt 1-2 and Alt 1.4) where the beam indication is performed in an aperiodic manner. In one example, the beam indication is performed via a TCI state included as a code-point in DL-related DCI. In one example, the beam indication is performed via a TCI state included as a code-point in UL-related DCI. In one example, the indicated code-point is selected from a set of TCI states configured via higher layer (RRC). In another example, the indicated code-point is selected from a set of TCI states configured via MAC CE activation command, where the set of TCI states can be selected from a larger set of TCI states configured via higher layer (RRC). In this case, the beam indication corresponds to a burst of M beams m=0, 1, . . . , M−1 such that over a period of time, the UL TX beam can change from m=0 to m=M−1 according to a pattern (sequence), which can be fixed, reported together with the beam reporting or configured. In one example, the set of M UL TX beams can represent a wider UL TX beam for control channel (PDCCH). For data channel (PDSCH), however, the UL TX beam will be one of the M UL TX beams. In one example, the UL TX beams for both control (PDCCH) and data (PDSCH) are the same, which is one of the M UL TX beams. An illustration of the UL beam indication according to this embodiment is similar (identical to) that shown for DL beam indication in FIG. 14.

In one sub-embodiment (2.2.2), a UE can initiate (or can be configured to initiate, e.g., based on L1 events such as beam failure detection) a beam indication mechanism indicating a set of M UL TX beams (cf. Alt 1-2 and Alt 1.4) where the initiated beam indication corresponds to an aperiodic indication. Some of details about UE-initiated beam report/indication can be found in U.S. patent application Ser. No. 16/946,915 filed on Feb. 11, 2021. The beam indication corresponds to a burst of M beams m=0, 1, . . . , M−1 such that over a period of time, the UL TX beam can change from m=0 to m=M−1 according to a pattern (sequence), which can be fixed, reported together with the beam reporting or configured. In one example, the set of M UL TX beams can represent a wider UL TX beam for control channel (PDCCH). For data channel (PDSCH), however, the UL TX beam will be one of the M UL TX beams. In one example, the UL TX beams for both control (PDCCH) and data (PDSCH) are the same, which is one of the M UL TX beams. An illustration of the UL beam indication according to this embodiment is similar (identical to) that shown for DL beam indication is shown in FIG. 14.

In one sub-embodiment (2.2.3), a UE is configured with a beam indication indicating a set of M UL TX beams (cf. Alt 1-2 and Alt 1.4) where the beam indication is performed in a semi-persistent manner. In one example, the semi-persistent beam indication is activated or deactivated based on a MAC CE based activation or deactivation command, respectively. When activated, the UE is indicated with a set of M UL TX beams in a periodic manner. The beam indication is deactivated based on a deactivation command. With such a beam indication mechanism, the beam indication can be performed sparingly. The UE can infer (interpolate) UL TX beams between two such beam indication instances via, e.g., an interpolated pattern, which can be fixed, reported together with the beam reporting or configured. In one example, the set of M UL TX beams can represent a wider UL TX beam for control channel (PDCCH). For data channel (PDSCH), however, the UL TX beam will be one of the M UL TX beams. In one example, the UL TX beams for both control (PDCCH) and data (PDSCH) are the same, which is one of the M UL TX beams. An illustration of the UL beam indication according to this embodiment is similar (identical to) that shown for DL beam indication is shown in FIG. 14.

In one sub-embodiment (2.2.4), a UE is configured with a beam indication indicating a set of M UL TX beams, e.g., as in sub-embodiments 2.2.1, 2.2.2, and 2.2.3 (e.g., via a TCI state mechanism), wherein the beam indication is a function of the (time) slot/subframe.

- In one example 2.2.4.1, UL TX beam #0 is indicated for a UL slot/subframe x, UL TX beam #1 is indicated for a UL slot/subframe x+1, UL TX beam #2 is indicated for a UL slot/subframe x+2, and so on.
- In one example 2.2.4.2, UL TX beam #0 is indicated for UL slots/subframes x, x+1, . . . , x+y−1, UL TX beam #1 is indicated for UL slots/subframes x+y, x+y+1, . . . , x+2y−1, UL TX beam #2 is indicated for a UL slots/subframes x+2y, x+2y+1, . . . , x+3y−1, and so on.

Here, x is a reference slot/subframe and y is a slot/subframe offset for UL beam switching. In one example, x can be fixed. Alternatively, x can be a function of UE speed. Alternatively, x can be configured. Alternatively, x can be reported by the UE. In another example, y can be fixed. Alternatively, y can be a function of UE speed. Alternatively, y can be configured. Alternatively, y can be reported by the UE. An illustration of the UL TX beams for the two examples similar (identical to) that shown for DL beam indication is shown in FIG. 15.

In one example, the NR mechanism for UL slot indication can be used (or extended) to indicate M slots or M groups of UL slots for which M UL TX beams are indicated via the TCI indication. For example, the parameter TDD-UL-DL-ConfigDedicated included in the information element (IE) TDD-UL-DL-Config can be used to indicate/configure the UL slot indices. In particular, the parameter slotIndex (bold highlighted below) provided via TDD-UL-DL-ConfigDedicated can be used for this purpose, where slotIndex identifies a slot within a dl-UL-TransmissionPeriodicity (given in tdd-UL-DL-configurationCommon).

```
TDD-UL-DL-ConfigDedicated ::=      SEQUENCE {
    slotSpecificConfigurationsToAddModList       SEQUENCE (SIZE (1..maxNrofSlots)) OF
TDD-UL-DL-SlotConfig           OPTIONAL, -- Need N
    slotSpecificConfigurationsToreleaseList      SEQUENCE (SIZE (1..maxNrofSlots)) OF
TDD-UL-DL-SlotIndex            OPTIONAL, -- Need N
    ...
}
TDD-UL-DL-SlotConfig ::=               SEQUENCE {
    slotIndex                   TDD-UL-DL-SlotIndex,
    symbols                     CHOICE {
        allDownlink             NULL,
        allUplink               NULL,
        explicit                SEQUENCE {
            nrofDownlinkSymbols                  INTEGER (1..maxNrofSymbols-1)
OPTIONAL, -- Need S
            nrofUplinkSymbols                    INTEGER (1..maxNrofSymbols-1)
OPTIONAL -- Need S
        }
    }
}
TDD-UL-DL-SlotIndex ::=             INTEGER (0..maxNrofSlots-1)
```

For instance, if slot indexing is according to Ex 2.2.4.1 (explained above), then slotIndex=x+m for m=0, 1, . . . , M−1, where x is a reference slot/subframe. If slot indexing is according to Ex 2.2.4.2 (explained above), then slotIndex=x+m×y for m=0, 1, . . . , M−1, where x is a reference slot/subframe and y is a slot/subframe offset for DL beam switching.

In some embodiments/alternatives/examples of this disclosure, a DL or UL slot can be replaced with a DL or UL subframe, respectively, or any other functionally equivalent entity in DL or UL, respectively, without changing the scope of the embodiments/alternatives/examples.

Figure 16:
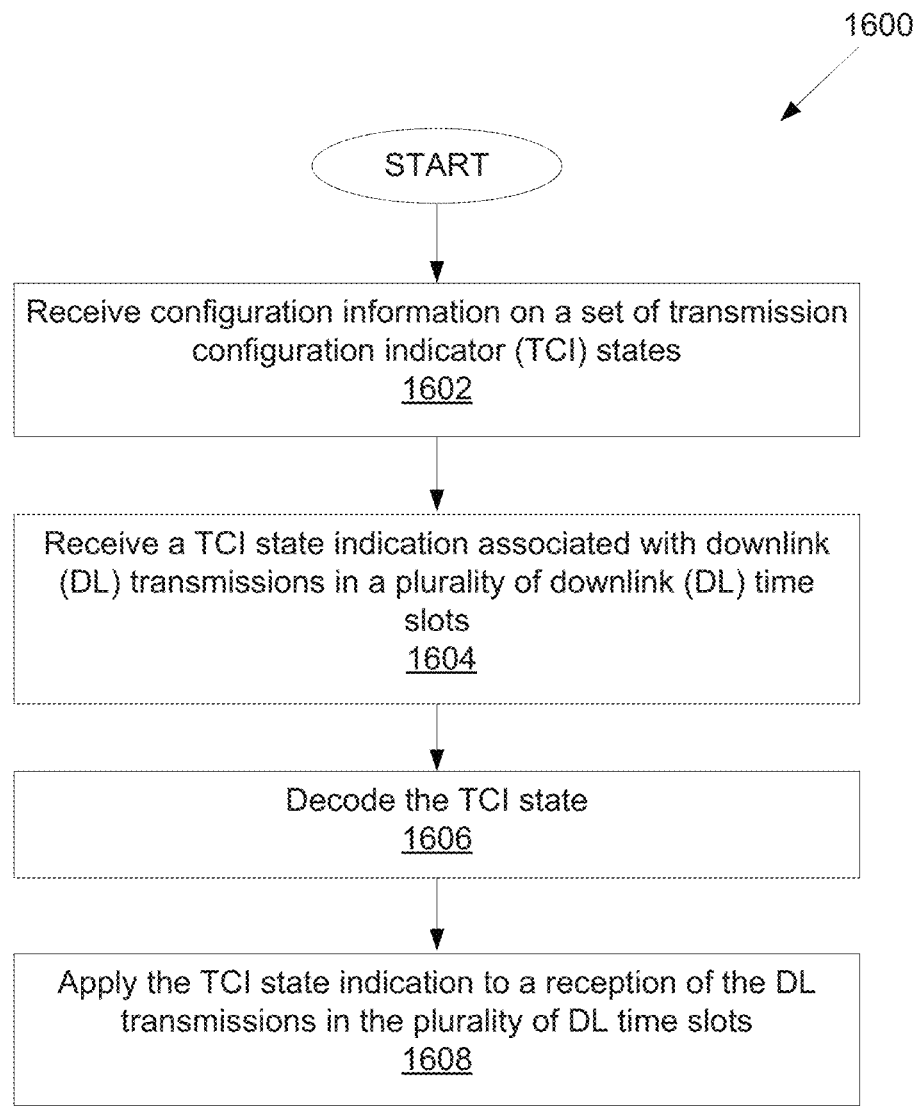
FIG. 16 illustrates a flow chart of a method for operating a user equipment (UE) according to embodiments of the present disclosure.

FIG. 16 illustrates a flow chart of a method 1600 for operating a user equipment (UE), as may be performed by a UE such as UE 116, according to embodiments of the present disclosure. The embodiment of the method 1600 illustrated in FIG. 16 is for illustration only. FIG. 16 does not limit the scope of this disclosure to any particular implementation.

As illustrated in FIG. 16, the method 1600 begins at step 1602. In step 1602, the UE (e.g., 111-116 as illustrated in FIG. 1) receives configuration information on a set of transmission configuration indicator (TCI) states.

In step 1604, the UE receives a TCI state indication associated with downlink (DL) transmissions in a plurality of downlink (DL) time slots.

In step 1606, the UE decodes the TCI state information.

In step 1608, the UE applies the TCI state indication to a reception of the DL transmissions in the plurality of DL time slots.

In one embodiment, each TCI state in the set of TCI states refers to a plurality of source reference signals (RSs) with a corresponding quasi co-location (QCL), the plurality of the source RSs are in one-to-one association with the DL transmissions in the plurality of the DL time slots, and the TCI state indication indicates one of the TCI states in the set of TCI states.

In one embodiment, each TCI state in the set of TCI states refers to a source reference signal (RS) with a corresponding quasi co-location (QCL), and the TCI state indication indicates a plurality of the TCI states from the set of TCI states that are in one-to-one association with the DL transmissions in the plurality of the DL time slots.

In one embodiment, the UE is further configured to receive an information about indices of the plurality of DL time slots.

In one embodiment, the UE receives a configuration to measure K source RSs and report a beam report, measures the K source RSs, determines the beam report, wherein the beam report includes an indicator that indicates a plurality of source RSs from the K source RSs, and transmits the determined beam report.

In one embodiment, the UE receives a value of a number of the TCI states comprising the plurality of TCI states from the set of TCI states.

In one embodiment, the UE receives a value of a number of time slots comprising the plurality of the DL time slots.

Figure 17:
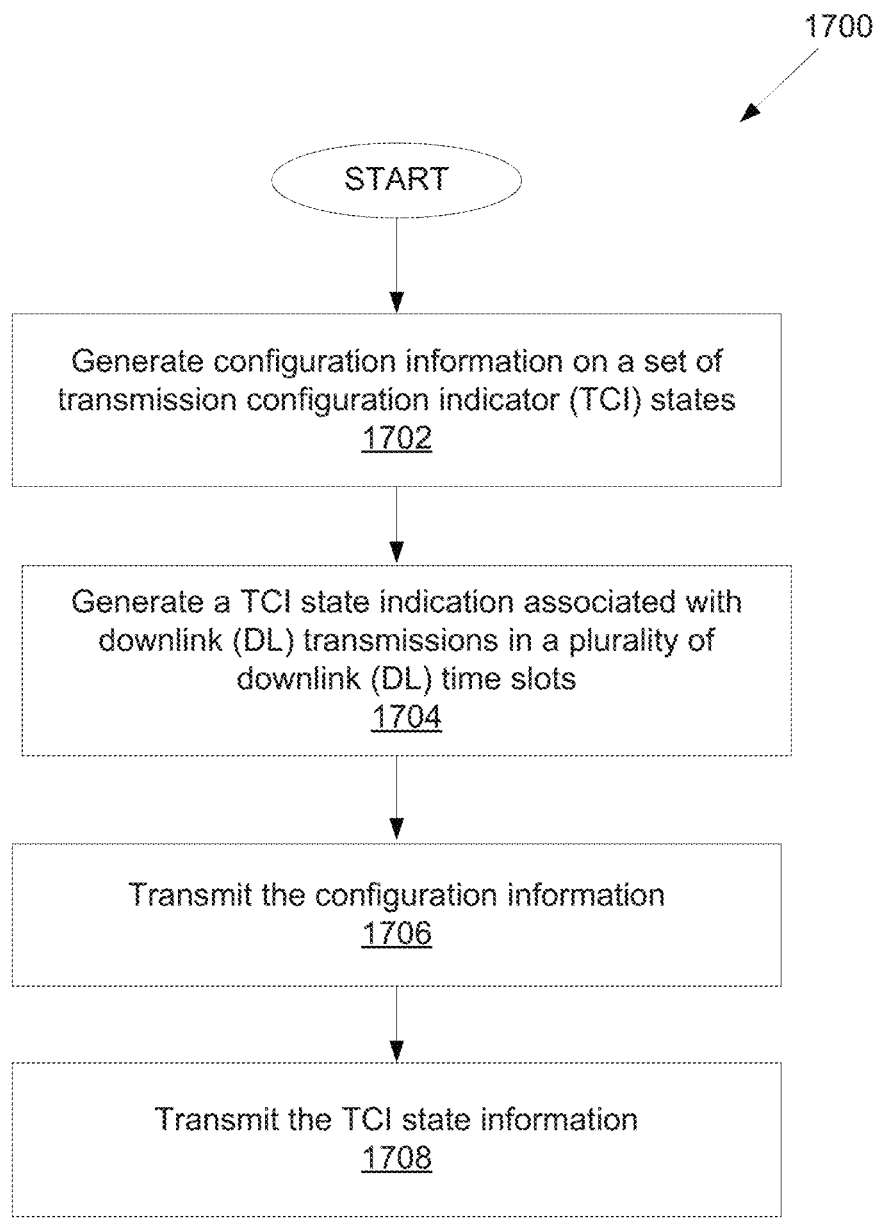
FIG. 17 illustrates a flow chart of another method as may be performed by a BS, according to embodiments of the present disclosure.

FIG. 17 illustrates a flow chart of another method 1700, as may be performed by a base station (BS) such as BS 102, according to embodiments of the present disclosure. The embodiment of the method 1700 illustrated in FIG. 17 is for illustration only. FIG. 17 does not limit the scope of this disclosure to any particular implementation.

As illustrated in FIG. 17, the method 1700 begins at step 1702. In step 1702, the BS (e.g., 101-103 as illustrated in FIG. 1) generates configuration information on a set of transmission configuration indicator (TCI) states.

In step 1704, the BS generates a TCI state indication associated with downlink (DL) transmissions in a plurality of downlink (DL) time slots.

In step 1706, the BS transmits the configuration information.

In step 1708, the BS transmits the TCI state indication.

In one embodiment, each TCI state in the set of TCI states refers to a plurality of source reference signals (RSs) with a corresponding quasi co-location (QCL), the plurality of the source RSs are in one-to-one association with the DL transmissions in the plurality of the DL time slots, and the TCI state indication indicates one of the TCI states in the set of TCI states.

In one embodiment, each of the TCI states in the set of TCI states refers to a source reference signal (RS) with a corresponding quasi co-location (QCL), and the TCI state indication indicates a plurality of the TCI states from the set of TCI states that are in one-to-one association with the DL transmissions in the plurality of the DL time slots.

In one embodiment, the BS transmits an information about indices of the plurality of DL time slots.

In one embodiment, the BS transmits a configuration for K source RSs and a beam report, and receives the beam report, wherein the beam report includes an indicator that indicates a plurality of source RSs from the K source RSs.

In one embodiment, the BS transmits a value of a number of the TCI states comprising the plurality of the TCI states from the set of TCI states.

In one embodiment, the BS transmits a value of a number of time slots comprising the plurality of the DL time slots.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
   transmit an initiator for a beam indication, wherein the initiator is based on an event detection, and
   receive, in response to the initiator, the beam indication indicating M beams for a period of time, where M>1; and
a processor operably coupled to the transceiver, the processor configured to:
   decode the beam indication and identify the M beams,
   determine a first beam from the M beams, and
   apply the first beam for a reception of a downlink (DL) signal in a first time slot,
wherein the first time slot is in the period of time.

2. The UE of claim 1, wherein the processor is further configured to:
   determine a second beam from the M beams that is different from the first beam, and
   apply the second beam for a reception of a DL signal in a second time slot in the period of time.

3. The UE of claim 1, wherein:
   the M beams correspond to M transmission configuration indicator (TCI) states,
   a TCI state of the M TCI states provides a source reference signal (RS) and an associated quasi-co-location (QCL) type, and the associated QCL type corresponds to type D indicating a beam that is used to transmit or receive the source RS.

4. The UE of claim 3, wherein the transceiver is further configured to receive, via higher layers, configuration information on a set of TCI states.

5. The UE of claim 1, wherein the beam indication is via media access control-control element (MAC CE), downlink control information (DCI), or a combination of MAC CE and DCI.

6. The UE of claim 1, wherein:
the transceiver is further configured to
transmit a second initiator for a beam report, and
receive, in response to the second initiator, an indication for the beam report,
the processor, based on the indication, is further configured to determine the beam report, and
the transceiver is further configured to transmit the beam report, where the beam report includes at least one indicator indicating N beams, where N>1.

7. A base station (BS) comprising:
a transceiver configured to:
receive an initiator for a beam indication, wherein the initiator is based on an event detection, and
transmit, in response to the initiator, the beam indication indicating M beams for a period of time, where M>1; and
a processor operably coupled to the transceiver, the processor configured to:
determine a first beam from the M beams, and
apply the first beam for a transmission of a downlink (DL) signal in a first time slot,
wherein the first time slot is in the period of time.

8. The BS of claim 7, wherein the processor is further configured to:
determine a second beam from the M beams that is different from the first beam, and
apply the second beam for a transmission of a DL signal in a second time slot in the period of time.

9. The BS of claim 7, wherein:
the M beams correspond to M transmission configuration indicator (TCI) states,
a TCI state of the M TCI states provides a source reference signal (RS) and an associated quasi-co-location (QCL) type, and
the associated QCL type corresponds to type D indicating a beam that is used to transmit or receive the source RS.

10. The BS of claim 9, wherein the transceiver is further configured to transmit, via higher layers, configuration information on a set of TCI states.

11. The BS of claim 7, wherein the beam indication is via media access control-control element (MAC CE), downlink control information (DCI), or a combination of MAC CE and DCI.

12. The BS of claim 7, wherein the transceiver is further configured to:
receive a second initiator for a beam report,
transmit, in response to the second initiator, an indication for the beam report, and
receive the beam report, where the beam report includes at least one indicator indicating N beams, where N>1.

13. A method performed by a user equipment (UE), the method comprising:
transmit an initiator for a beam indication, wherein the initiator is based on an event detection;
receive, in response to the initiator, the beam indication indicating M beams for a period of time, where M>1;
decode the beam indication and identify the M beams;
determine a first beam from the M beams; and
apply the first beam for a reception of a downlink (DL) signal in a first time slot,
wherein the first time slot is in the period of time.

14. The method of claim 13, further comprising:
determining a second beam from the M beams that is different from the first beam, and
applying the second beam for a reception of a DL signal in a second time slot in the period of time.

15. The method of claim 13, wherein:
the M beams correspond to M transmission configuration indicator (TCI) states,
a TCI state of the M TCI states provides a source reference signal (RS) and an associated quasi-co-location (QCL) type, and
the associated QCL type corresponds to type D indicating a beam that is used to transmit or receive the source RS.

16. The method of claim 15, further comprising receiving, via higher layers, configuration information on a set of TCI states.

17. The method of claim 13, further comprising:
transmitting a second initiator for a beam report;
receiving, in response to the second initiator, an indication for the beam report;
determining the beam report; and
transmitting the beam report, where the beam report includes at least one indicator indicating N beams, where N>1.

* * * * *